(12) United States Patent
Nguyen et al.

(10) Patent No.: US 8,412,772 B1
(45) Date of Patent: *Apr. 2, 2013

(54) CONTENT SHARING VIA SOCIAL NETWORKING

(75) Inventors: Bill Nguyen, Palo Alto, CA (US); Vincent Mallet, Portola Valley, CA (US); Nicholas Woods, San Francisco, CA (US); Jessica Cheng, Mountain View, CA (US); Sandip Chokshi, Palo Alto, CA (US); Ganesh Ramanarayanan, Menlo Park, CA (US); Megan Streich, San Francisco, CA (US)

(73) Assignee: Color Labs, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,227

(22) Filed: Feb. 16, 2012

Related U.S. Application Data

(60) Provisional application No. 61/537,526, filed on Sep. 21, 2011.

(51) Int. Cl.
G06F 15/16 (2006.01)
(52) U.S. Cl. .................. 709/204; 709/205; 709/206
(58) Field of Classification Search .................. 709/204, 709/205, 206; 705/26
See application file for complete search history.

(56) References Cited

U.S. PATENT DOCUMENTS

| | | | |
|---|---|---|---|
| 6,993,325 B1 | 1/2006 | Waesterlid | |
| 7,177,904 B1 | 2/2007 | Mathur et al. | |
| 7,266,383 B2 | 9/2007 | Anderson | |
| 7,546,369 B2 | 6/2009 | Berg | |
| 7,644,144 B1 | 1/2010 | Horvitz et al. | |
| 7,680,770 B1 | 3/2010 | Buyukkokten et al. | |
| 7,702,728 B2 | 4/2010 | Zaner et al. | |
| 7,730,216 B1 | 6/2010 | Issa et al. | |
| 7,813,277 B2 | 10/2010 | Okholm et al. | |
| 7,886,327 B2 | 2/2011 | Stevens | |
| 7,938,727 B1 | 5/2011 | Konkle | |
| 7,954,058 B2 | 5/2011 | Kalaboukis et al. | |
| 7,958,193 B2 | 6/2011 | Augustine et al. | |
| 7,970,111 B2 | 6/2011 | Swanburg | |
| 7,970,350 B2 | 6/2011 | Sheynman et al. | |
| 7,970,418 B2 | 6/2011 | Schmidt et al. | |
| 7,975,062 B2 | 7/2011 | Krikorian et al. | |
| 7,996,566 B1 * | 8/2011 | Sylvain et al. | 709/248 |
| 8,010,602 B2 | 8/2011 | Shen et al. | |
| 8,051,157 B2 * | 11/2011 | Park et al. | 709/223 |
| 8,103,729 B2 | 1/2012 | Tornabene et al. | |
| 8,145,532 B2 * | 3/2012 | Jones et al. | 705/26.1 |
| 2002/0052942 A1 | 5/2002 | Swildens et al. | |
| 2003/0004916 A1 | 1/2003 | Lewis | |

(Continued)

OTHER PUBLICATIONS

"U.S. Appl. No. 13/398,296 , Response filed Aug. 9, 2012 to Non Final Office Action mailed May 14, 2012", 12 pgs.

(Continued)

*Primary Examiner* — Adnan Mirza
(74) *Attorney, Agent, or Firm* — Schwegman Lundberg Woessner P.A.

(57) ABSTRACT

Example systems and methods of content sharing via social networking are presented. In one example, availability of a first user device to provide media content over a communication network is detected. A second user device is identified via an association of the first user device with the second user device that is specified in a social network. An acceptance by the second user device to receive the media content from the first user device is determined. In response to the acceptance, transmission of the media content provided by the first user device over the communication network to the second user device is initiated.

26 Claims, 33 Drawing Sheets

U.S. PATENT DOCUMENTS

| | | | |
|---|---|---|---|
| 2003/0069867 A1 | 4/2003 | Coutts et al. | |
| 2004/0236850 A1 | 11/2004 | Krumm et al. | |
| 2005/0188098 A1 | 8/2005 | Dunk | |
| 2005/0193099 A1 | 9/2005 | Reus et al. | |
| 2005/0266835 A1 | 12/2005 | Agrawal et al. | |
| 2006/0109083 A1 | 5/2006 | Rathus et al. | |
| 2006/0146765 A1 | 7/2006 | Van De Sluis et al. | |
| 2006/0159109 A1 | 7/2006 | Lamkin et al. | |
| 2006/0230170 A1 | 10/2006 | Chintala et al. | |
| 2006/0241860 A1 | 10/2006 | Kimchi et al. | |
| 2006/0242234 A1 | 10/2006 | Counts et al. | |
| 2007/0032244 A1 | 2/2007 | Counts et al. | |
| 2007/0226799 A1 | 9/2007 | Gopalan et al. | |
| 2007/0237096 A1 | 10/2007 | Vengroff et al. | |
| 2007/0255579 A1 | 11/2007 | Boland et al. | |
| 2008/0098087 A1 | 4/2008 | Lubeck | |
| 2008/0133658 A1 | 6/2008 | Pennington | |
| 2008/0133767 A1* | 6/2008 | Birrer et al. | 709/231 |
| 2008/0140650 A1 | 6/2008 | Stackpole | |
| 2008/0222295 A1 | 9/2008 | Robinson et al. | |
| 2008/0222308 A1 | 9/2008 | Abhyanker | |
| 2009/0144392 A1* | 6/2009 | Wang et al. | 709/217 |
| 2009/0158176 A1 | 6/2009 | Kalaboukis et al. | |
| 2009/0164600 A1* | 6/2009 | Issa et al. | 709/215 |
| 2009/0187936 A1 | 7/2009 | Parekh et al. | |
| 2009/0192887 A1 | 7/2009 | Moore et al. | |
| 2009/0215469 A1 | 8/2009 | Fisher et al. | |
| 2009/0265426 A1 | 10/2009 | Svendsen et al. | |
| 2009/0319288 A1 | 12/2009 | Slaney et al. | |
| 2010/0031156 A1 | 2/2010 | Doyle et al. | |
| 2010/0036912 A1 | 2/2010 | Rao | |
| 2010/0048242 A1 | 2/2010 | Rhoads et al. | |
| 2010/0070542 A1 | 3/2010 | Feinsmith | |
| 2010/0142447 A1* | 6/2010 | Schlicht et al. | 370/328 |
| 2010/0146115 A1* | 6/2010 | Bezos | 709/225 |
| 2010/0185630 A1 | 7/2010 | Cheng et al. | |
| 2010/0191728 A1 | 7/2010 | Reilly et al. | |
| 2010/0208033 A1 | 8/2010 | Edge et al. | |
| 2010/0250458 A1* | 9/2010 | Ho | 705/319 |
| 2010/0299391 A1* | 11/2010 | Demarta et al. | 709/205 |
| 2011/0016399 A1 | 1/2011 | Yasrebi et al. | |
| 2011/0029608 A1 | 2/2011 | Harple et al. | |
| 2011/0034176 A1 | 2/2011 | Lord et al. | |
| 2011/0055289 A1 | 3/2011 | Ennis | |
| 2011/0061108 A1* | 3/2011 | Arrasvuori et al. | 726/27 |
| 2011/0066743 A1* | 3/2011 | Hurley et al. | 709/231 |
| 2011/0072078 A1 | 3/2011 | Chai et al. | |
| 2011/0072114 A1 | 3/2011 | Hoffert et al. | |
| 2011/0078129 A1 | 3/2011 | Chunilal | |
| 2011/0082915 A1* | 4/2011 | Carr et al. | 709/219 |
| 2011/0083101 A1 | 4/2011 | Sharon et al. | |
| 2011/0131100 A1 | 6/2011 | Soza et al. | |
| 2011/0137976 A1 | 6/2011 | Poniatowski et al. | |
| 2011/0143811 A1 | 6/2011 | Rodriguez | |
| 2011/0153740 A1 | 6/2011 | Smith et al. | |
| 2011/0161319 A1 | 6/2011 | Chunilal | |
| 2011/0161348 A1* | 6/2011 | Oron | 707/769 |
| 2011/0173235 A1 | 7/2011 | Aman et al. | |
| 2011/0179025 A1 | 7/2011 | Chuang | |
| 2011/0191447 A1 | 8/2011 | Dazzi et al. | |
| 2011/0202430 A1 | 8/2011 | Narayanan et al. | |
| 2011/0209191 A1 | 8/2011 | Shah | |
| 2011/0212717 A1 | 9/2011 | Rhoads et al. | |
| 2011/0225608 A1 | 9/2011 | Lopatecki et al. | |
| 2011/0228918 A1 | 9/2011 | Ayers et al. | |
| 2011/0246574 A1 | 10/2011 | Lento et al. | |
| 2011/0270719 A1 | 11/2011 | Hollars et al. | |
| 2011/0282947 A1* | 11/2011 | Dodson | 709/206 |
| 2011/0282965 A1* | 11/2011 | Dodson | 709/217 |
| 2011/0283236 A1 | 11/2011 | Beaumier et al. | |
| 2011/0311199 A1* | 12/2011 | Fay et al. | 386/241 |
| 2012/0016817 A1 | 1/2012 | Smith et al. | |
| 2012/0059884 A1* | 3/2012 | Rothschild | 709/206 |
| 2012/0066722 A1* | 3/2012 | Cheung et al. | 725/62 |
| 2012/0079119 A1* | 3/2012 | Gill et al. | 709/227 |
| 2012/0083286 A1 | 4/2012 | Kim et al. | |
| 2012/0084666 A1* | 4/2012 | Hickman | 715/751 |
| 2012/0084731 A1 | 4/2012 | Filman et al. | |
| 2012/0102124 A1 | 4/2012 | Hansson et al. | |

OTHER PUBLICATIONS

"U.S. Appl. No. 13/398,296, Non Final Office Action mailed May 14, 2012", 11 pgs.

"U.S. Appl. No. 13/398,402, Examiner Interview Summary mailed Aug. 6, 2012", 3 pgs.

"U.S. Appl. No. 13/398,402, Non Final Office Action mailed Apr. 12, 2012", 35 pgs.

"U.S. Appl. No. 13/398,402, Response filed Jul. 12, 2012 to Non Final Office Action mailed Apr. 12, 2012", 20 pgs.

"U.S. Appl. No. 13/398,443, Restriction Requirement mailed May 11, 2012", 5 pgs.

"U.S. Appl. No. 13/398,445, Non Final Office Action mailed Jul. 17, 2012", 6 pgs.

"U.S. Appl. No. 13/404,356, Examiner Interview Summary mailed Aug. 13, 2012", 17 pgs.

"U.S. Appl. No. 13/404,356, Non Final Office Action mailed May 8, 2012", 22 pgs.

"U.S. Appl. No. 13/404,356, Response filed Aug. 8, 2012 to Non Final Office Action mailed May 8, 2012", 14 pgs.

"U.S. Appl. No. 13/404,370 , Response filed Aug. 9, 2012 to Non Final Office Action mailed May 9, 2012", 12 pgs.

"U.S. Appl. No. 13/404,370, Examiner Interview Summary mailed Aug. 10, 2012", 3 pgs.

"U.S. Appl. No. 13/404,370, Non Final Office Action mailed May 9, 2012", 22 pgs.

"U.S. Appl. No. 13/404,381, Examiner Interview Summary mailed Aug. 9, 2012", 3 pgs.

"U.S. Appl. No. 13/404,381, Non Final Office Action mailed May 11, 2012", 19 pgs.

"U.S. Appl. No. 13/404,393, Examiner Interview Summary mailed Aug. 14, 2012", 3 pgs.

"U.S. Appl. No. 13/404,393, Non Final Office Action mailed May 16, 2012", 20 pgs.

"U.S. Appl. No. 13/404,393, Response filed Aug. 14, 2012 to Non Final Office Action mailed May 16, 2012", 11 pgs.

"International Application Serial No. PCT/US2012/030115, International Search Report mailed Jun. 20, 2012", 4 pgs.

"International Application Serial No. PCT/US2012/030115, Written Opinion mailed Jun. 20, 2012", 8 pgs.

"International Application Serial No. PCT/US20121056531, Written Opinion mailed Nov. 29, 2012", 6 pgs.

"International Application Serial No. PCT/US2012/056531, Written Opinion mailed Nov. 29, 2012", 6 pgs.

* cited by examiner

700E

SANDIP CHOKSHI | HOME | ▽

☐ NICK WOODS'S BIRTHDAY TODAY
☐ 2 EVENTS AND 2 INVITES

PEOPLE YOU MAY KNOW          SEE ALL

JEN MACDONALD
8 MUTUAL FRIENDS
+1 ADD FRIEND

JING XU
7 MUTUAL FRIENDS
+1 ADD FRIEND

SPONSORED STORIES             SEE ALL

PREMAL SHAH LIKES BILL GEORGE

BILL GEORGE
👍 LIKE

AJOY BHAMBANI LIKES LOT 18

LOT 18   LOT 18
         👍 LIKE

TICKER

VINCENT MALLET IS HOSTING
A VISIT ON BLUE

DEEPALI BANKAR COMMENTED ON MINDA
PAPSON'S LINK: "HE WAS JUST AT ACL!
ENJOY THE ..."

FIG. 7G

CONTENT SHARING VIA SOCIAL NETWORKING

CROSS-REFERENCE TO RELATED PATENT DOCUMENTS

This patent application claims the benefit of priority of U.S. Provisional Application No. 61/537,526, entitled "CONTENT SHARING VIA SOCIAL NETWORKING," filed Sep. 21, 2011, which is hereby incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent and Trademark Office patent files or records, but otherwise reserves all copyright rights whatsoever. The following notice applies to the software and data as described below and in the drawings that form a part of this document: Copyright 2012, Color Labs, Inc. All Rights Reserved.

TECHNICAL FIELD

This application relates generally to the communication of content and, more specifically, to systems and methods for the sharing of content facilitated via social networking.

BACKGROUND

An ever-increasing use of the Internet is the sharing among users of content, such as video clips, audio segments, photographs, and the like. Many mechanisms exist for such sharing, from direct transfer of such content from one user to another, such as by way of e-mail, to the posting of such content on a website so that the content may be available to visitors of the website. The capabilities of the Internet and associated communication devices have evolved so that more advanced forms of content sharing, including one-on-one video conferencing, such as by way of Skype® and other mechanisms, have become more commonplace.

An innovation of the Internet that has also become popular among users is the creation of human "social" networks, such as Facebook® and Myspace®. In such a network, friends, acquaintances, and other types of human relationships may be explicitly specified, allowing connected or associated users to stay apprised of the current status and ongoing actions of each other. Such status may also include content, such as photographs, posted by one user to be viewed by other connected users.

BRIEF DESCRIPTION OF THE DRAWINGS

Some embodiments are illustrated by way of example and not limitation in the figures of the accompanying drawings in which.

DETAILED DESCRIPTION

Example methods and systems for sharing content, such as photographs, audio content, video content, textual content, graphical content, and the like, via a social network are discussed. In the following description, for purposes of explanation, numerous specific details are set forth in order to provide a thorough understanding of example embodiments. It will be evident, however, to one skilled in the art that the present subject matter may be practiced without these specific details. It will also be evident that the particular types of systems and methods described herein are not limited to the examples provided and may include other scenarios not specifically discussed.

Figure 1:
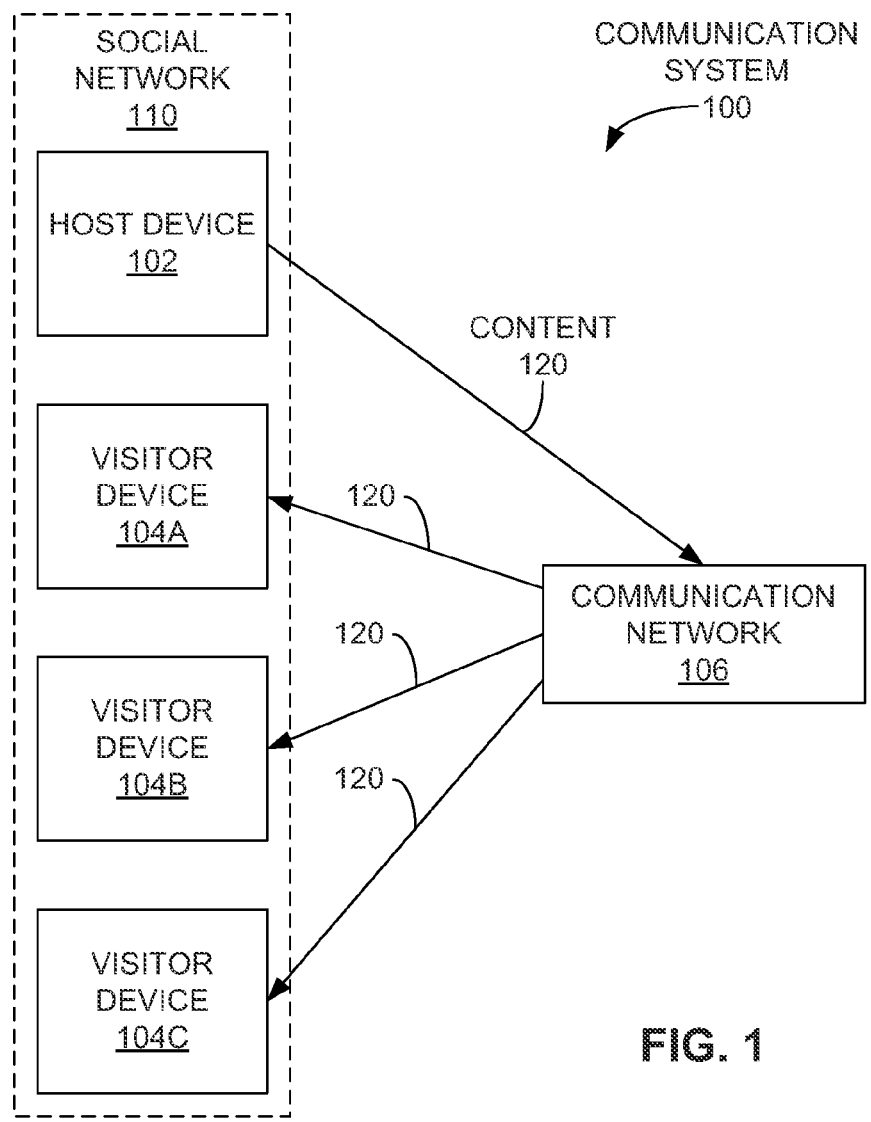
FIG. 1 is a block diagram illustrating an example communication system.

In accordance with an example embodiment, FIG. 1 illustrates an example communication system 100 for the sharing of content 120 among multiple users. The content 120 may be any content generated or captured by a user that is of interest to another user, including, but not limited to, video content, audio content, audio/video content, textual or graphical content, and photographs or still photo images. Types of textual or graphical content may include, for example, textual or map data indication a location of a user as determined by electronic signals, environmental data, and other inputs that may be captured by a user device. In one implementation, the capture of the content 120 may be ongoing while the content 120 is being shared or distributed within the communication system 100.

The communication system 100 includes at least one host device 102 and multiple visitor devices 104A, 104B, 104C (collectively or individually, 104) associated with users or members of a social network 110 that share content by way of a communication network 106. Examples of the social network 110, or the infrastructure supporting such a network 110, include, but are not limited to, Facebook® and Myspace®. In other examples, other devices not strictly associated with the social network 110 may also send or receive the content 120 via the communication network 106.

Examples of the communication network 106 may include, but are not limited to, any and/or all of a wide-area network (such as the Internet), a local-area network (LAN) (such as an IEEE 802.11x (Wi-Fi) network), a Bluetooth connection, a Near Field Communication (NFC) connection, an Ethernet connection, a mobile or cellular communications device network (such as a third generation (3G) or fourth generation (4G) connection), and a microcell network, or combinations thereof. The communication network 106 may include one or more servers, such as web or API servers, content distribution servers, and the like, as is described in greater detail below, one or more of which may support the operation of the social network 110. In some examples, the communication network 106 may include any number of transmitters, receivers, switches, repeaters, and other components to facilitate communication between the host device 102 and the visiting devices 104.

As shown in FIG. 1, the host device 102 provides or sources the content 120 by way of the communication network 106 to one or more visitor devices 104 for presentation or display to the users of the visitor devices 104. In some implementations, each of the host device 102 and/or the visitor devices 104 may be any communication device capable of generating, capturing, transmitting, and/or receiving the content 120. Examples of the host device 102 and the visitor devices 104 include, but are not limited to, smart phones, personal digital assistants (PDAs), desktop computers, laptop computers, netbook computers, tablet computers, gaming systems, and televisions. While FIG. 1 displays a single host device 102 and three member visitor devices 104, any number of host devices 102 and visitor devices 104 may share multiple items or streams of content 120 via the communication network 106. In many instances, a single user device may operate as both a host device 102 that provides content 120, and as a visitor device 104 that receives content 120, at various times, or even concurrently or simultaneous.

In at least some examples, the communication system 100 employs the social network 110 or associated access site to notify users of potential visitor devices 104 of the availability of content 120 being hosted by a host device 102 automatically in a timely manner. A potential reason for employing the social network 110 in this capacity is that users most likely to be interested in receiving the content 120 may be those that are connected to the user of the host device 102 in some way, such as friends, family members, or acquaintances, as may be indicated by way of the social network 110. Additionally, comments or other indications, such as "likes", regarding the content 120 may be easily provided via the same network 110. Other potential advantages may be discerned from the various embodiments described in greater detail below.

As employed herein, a host may be any user or some other identifiable entity or organization that may source the content 120 to be shared. For example, a news agency capable of streaming video content, and that may also maintain a presence on the social network 110, may be considered a host. Likewise, a visitor may be any user, entity, or organization that may "visit" a host by receiving the content 120 being generated or transmitted by that host.

Figure 2:
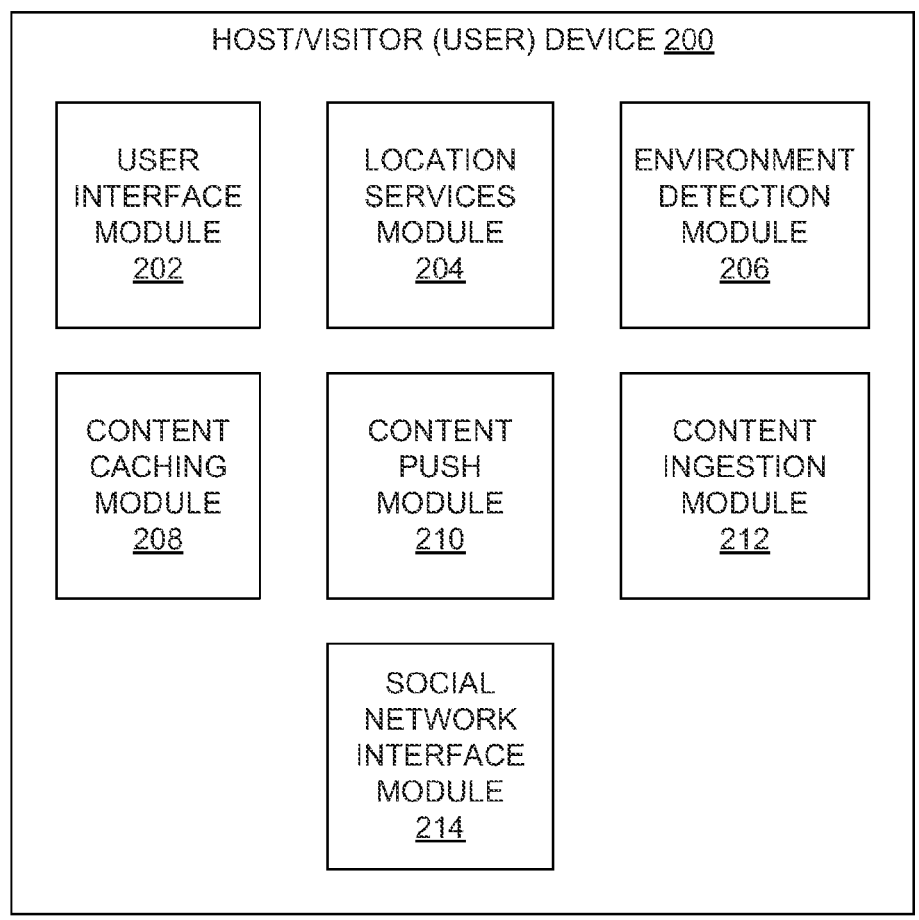
FIG. 2 is a block diagram illustrating modules of an example host and/or visiting device of an example communication system.

FIG. 2 is a block diagram of an example embodiment of a host and/or visitor (or user) device 200 that may serve as one of the host devices 102 and/or visitor devices 104 depicted in FIG. 1. The user device 300 may include a number of software and/or hardware modules, such as a user interface module 202, a location services module 204, an environment detection module 206, a content caching module 208, a content push mechanism module 210, a content ingestion module 212, and a social network interface module 214. In other user devices 200, one or more of the modules 202-214 may be omitted, and one or more modules not depicted in FIG. 2 may be included. In one example, the modules 202-214 may be software modules that constitute at least part of an application being executed by one or more processors on the user device 200. More generally, the modules 202-214 may be hardware, software, firmware, or some combination thereof.

In the user device 200, the user interface module 202 may facilitate various operations for the sharing and receiving of content 120 by the user of the host/visitor device 200, as well as access to the social network 110 employed to facilitate the content sharing. As discussed more fully below, these aspects may include, but are not limited to, the request or approval of the sharing of content 120, the actual capture, generation, and/or viewing of the content 120, and the specification by a user of the types of content 120 or possible hosts of content 120 of interest to the user, as well as any interfacing with the social network 110 performed in conjunction with the sharing of content 120. More specific examples of the user interface provided by the user interface module 202 are discussed in greater detail below in conjunction with FIGS. 6A through 6J and FIGS. 7A through 7O.

The location services module 204 may provide or generate information regarding the physical location of the user device 200. In one example, the location services module 204 may determine location by way of signals received from a Global Positioning System (GPS), an Assisted GPS (A-GPS), a WiFi Positioning System, and/or cell-site triangulation. The location services module 204 may receive such signals by way of circuitry of the user device 200 and process one or more of the signals to determine the location. As described below, this location information may be used to determine if and when content 120 may be offered for reception by other users.

The environment detection module 206 may receive signals from one or more sensors residing on, or in communication with, the user device 200 to indicate various environmental conditions in the vicinity of the user device 200. Such signals may indicate, for example, atmospheric pressure, temperature, light, velocity, acceleration, orientation, and so on, as generated by sensors such as light meters, accelerometers, gyroscopes, thermometers, and the like. For example, persistent changes in acceleration may indicate the client device is located in a moving car, or the detection of multiple voices may indicate presence within a crowd. The environment detection module 206 may also employ signals from various communication network interfaces, such as Near-Field Communication (NFC) signals, Bluetooth® communication signals, WiFi communication signals, and the like to supplement and enhance the location information of the user device 200 generated by the location services module 206 to more closely define the location of the user device 200.

The content caching module 208 may store locally on the user device 200 content 120 that has been captured at the user device 200 but has not been transmitted to the communication network 106 for sharing with other user devices 200, such as during times when the user device 200 has lost contact with the communication network 106. In response to the connection between the communication network 106 and the user device 200 being restored, the cached content, including photos, audio, video, textual data, graphical data, and the like, may then be uploaded to a server or other node of the communication network 106 for subsequent transfer to the other user devices 200.

The content push mechanism module 210 facilitates the reception of content 120 at the device 200 operating as a visitor device 200 from a distribution server or other device of the communication network 106 under a "push" data transfer model. For example, a Comet web application model may be employed to receive content 120 and other data under a "hanging GET" protocol, in which the server maintains a HyperText Transfer Protocol (HTTP) request from the user device 200 indefinitely to push the content 120 to the user device 200.

The content ingestion module 212 may be responsible for taking the content 120 captured at the user device 200 and possibly modifying, adjusting, or otherwise processing the content 120 before sharing the data via the communication network 106. For still image content 120, examples of such processing may include, but are not limited to, scaling the image, and adjusting the resolution, orientation, brightness, sharpness, color, contrast, or focus of the image. These operations may depend on several factors, including, but not limited to, the capture and display capabilities of the user device 200, and the speed of the communication network 106 coupling the user device 200 with other user devices 200. The content ingestion module 212 may also package various metadata with the content 120, such as the location and environmental data discussed above.

The social network interface module 214 may facilitate the transfer of information, as well as the processing of that information, between an application executing on the user device 200 and the social network 110. Such information may include, for example, "friends", family members, and/or acquaintances of users as denoted in the social network 110, as well as their current status, possibly including their current location. This information may be utilized to ascertain potential visitors for a host of content 120. In some examples, comments, "likes", and similar information regarding a visitor's view of content 120 or a host of that content 120 may also be maintained by the social network 110 to provide information to other potential visitors of content 120 or a host of that content 120. Other information may also be transmitted between the social network 110 and the application in other embodiments. In addition, the application may allow a user of the device 200 executing the application to log-on to the social network 100 and perform a number of social-network-related functions via the application.

Figure 3:
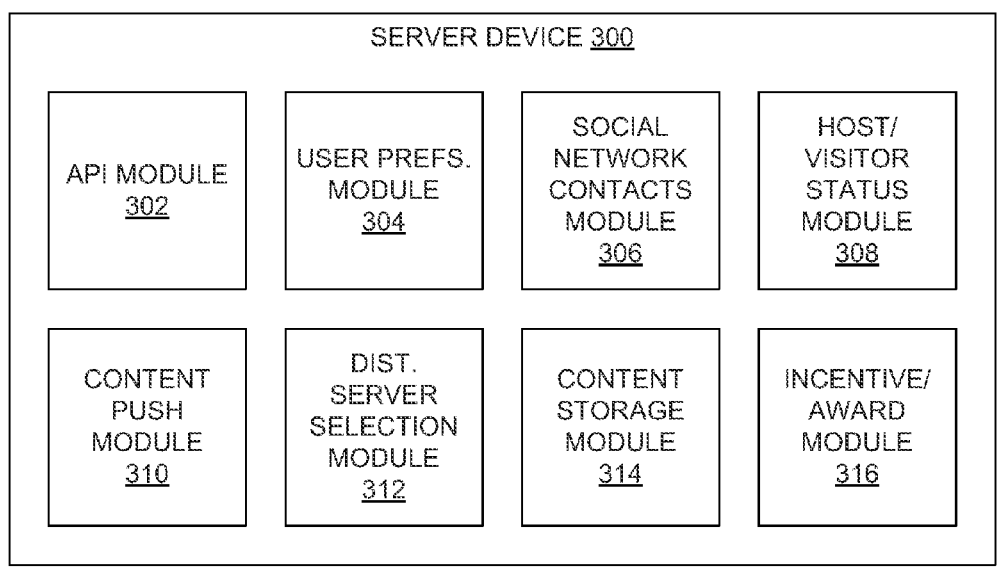
FIG. 3 is a block diagram illustrating modules of an example server of an example communication system.

FIG. 3 is a block diagram of an example embodiment of a server device 300 located within, or coupled with, the communication network 106 of FIG. 1. In at least some examples, the server device 300 may facilitate activities regarding the transmission of content 120 between user devices 200, including, for example, the determination of potential visitors via the social network 110, as well as the initiation and continued control of the transmission of content 120 between the user devices 200. In various examples, the service device 300 may be an Applications Programming Interface (API) server, a web server, or another type of server capable of performing the various operations described herein.

The server device 300 may include a number of software and/or hardware modules, such as an API module 302, a user preferences module 304, a social network contacts module 306, a host/visitor status module 308, a content push mechanism module 310, a distribution server selection module 312, a content storage module 314, and an incentive/award module 316. In other server devices 300, one or more of the modules 302-316 may be omitted, and one or more modules not depicted in FIG. 3 may be included. In one example, the modules 302-316 may be software modules that constitute at least part of an application being executed by one or more processors on the server device 300. More generally, the modules 302-316 may be hardware, software, firmware, or some combination thereof. Further, the server device 300 may be embodied in multiple separate devices that form a system capable of accomplishing the operations of the server device 300 as described herein.

The API module 302 may facilitate communications between the server device 300 and multiple user devices 200 and/or the social network 110 for a variety of purposes. Such purposes may include, but are not limited to, the collection of information from the social network 110 for determining possible hosts of the content 120 and potential visitors for those hosts, information regarding the perception of visitors of a particular host or associated content 120, and communication between the server device 300 and the user devices 200 regarding the initiation and control of the actual sharing of content 120 among the user devices 200.

The user preferences module 304 acquires and maintains data associated with the preferences of potential hosts and visitors of content 120 regarding the transmission and reception of the content 120. For example, the user preferences module 304 may maintain data generated from user responses in association with the first execution of an application employed in the user device 200 to facilitate the sharing of content 120. Explicit user preferences may also be retrieved at other times by way of the application in other examples. Examples of such user preferences are described more fully below in conjunction with FIG. 4C.

One type of user preference data may include the types of content 120 in which each potential visitor may be interested. The types of content 120 may refer to, for example, the format of the content 120 (for example, video, audio, textual, graphical, and so on), the subject matter of the content 120 (for example, sports-related, news-related, family-related, friend-related, and so forth), and other factors associated with the content 120. In one example, the user may indicate a preference for particular content 120 by way of "liking" the content 120, or providing positive comments regarding the content 120, as mentioned above.

Another type of preference data may not be explicitly specified by the user, but is instead derived from previous user actions, such as previous content 120 viewed, previous hosts visited, previous websites viewed, days of the week or times of the day during which such user actions occurred, user activities in connection with the social network 110 (FIG. 1), and so forth.

In some implementations, the user preference information may be employed to automatically present certain types of content 120, or content 120 from certain hosts, to the user without prompting the user for approval. In other examples, the preference information may be used to inform the user of content 120 in which the user may be interested, and query the user as to whether they desire to visit the host associated with the content 120. In yet other situations, the preference information may prevent certain content 120 from being offered to the user, such as when the user has explicitly indicated a lack of interest in such content 120, or in any content 120 from a particular host designated by the user.

The social network contacts module 306 may retrieve data from the social network 110 identifying friends, family, likes, and so on for each potential visiting user. Further, this data may be updated by way of retrieving the information periodically from the social network 110. For example, the data may indicate hosts and their associated potential visitors based on friends, family, and other acquaintances as indicated in the social network 110. The social network contacts module 306 may also identify other potential visitors for any particular hosts based on commonalities or other factors possibly linking a host and a potential visitor, including, but not limited to, related educational backgrounds, business associations, social interests, and the like. In another example, relationships other than those specifically designated by the social network 110, such as friends of friends, friends of family members, and the like, may be regarded as potential visitors for each possible host of content 120. Conversely, the social network contacts module 306 may track potential hosts for a user in a possible visitor role in a way similar to that described above.

The host/visitor status module 308 may maintain current information, and possibly historical data, regarding the status of each user device 200. This information may include, for example, the current geographic location of each user device

200, as well as previous locations of the device 200. As indicated above, such data may be provided by the location services module 204 and/or the environment detection module 206 of each user device 200.

With respect to content sharing, the host/visitor status module 308 may maintain information regarding current and/or former visitations from both a host and a visitor standpoint. Such information may include the format, subject matter, and other aspects of the content 120 transmitted or received, the visitors or host associated with the content 120 being shared, any particular distribution servers employed to forward the content 120 from the host to the visitor, and the like.

As will be described in greater detail below, this status information may be utilized to determine whether a host is currently sharing content 120 (and, thus, possibly available to continue to share that content 120 with other visitors), whether the host has performed some kind of action or "gesture" via the user device 200 of the host which would indicate that the host may be in a position to share content 120 with one or more potential visitors, and identify which potential visitors may be interested in receiving the content 120.

The content push module 310 may provide the functionality for the server device 300 to push content to the visitor devices 200 of a particular group 110. As mentioned above, the pushing of content 120 may be facilitated by way of a Comet web application model to distribute content 120 and other data to the client devices 300 under a "hanging GET" protocol. In another example, the functionality of the content push module 310 may provided by way of a separate service device, such as a server device specifically allocated to perform the distribution of the content 120 from a host device to a visitor device.

The distribution server selection module 312 may select a distribution server from a group of such servers to perform the content 120 distribution from a host to one or more visitor devices 200. In one example, the group of servers may define a distribution server "farm" provided primarily for content distribution. To perform the selection, the distribution server selection module 312 may access information regarding an item or stream of content 120 to be distributed to a new visitor requesting the content 120. Depending on the current number of visitors being serviced by each of the distribution servers, possibly in addition to other factors, the distribution server selection module 312 may select a distribution server currently servicing other visitors or a new distribution server from the group to provide the content 120 to the new visitor.

The content storage module 314 may store and manage content 120 that is yet to be distributed to one or more visitor user devices 200. For example, the content push module 310 may allow visitor devices 200 that are in the process of receiving content 120 while employing the server device 300 in a digital video recorder (DVR) mode in which pausing, rewind, fast-forward, and similar playback modes are provided. The content storage module 314 may also provide a complete item or stream of content 120 to a visitor that has started its visitation of the host after the start of the content 120 has been transmitted to other visitors, resulting in the content 120 being delayed to the late-arriving visitor relative to the other visitors. In other implementations, the functionality of the content storage module 314 may be provided in a separate distribution server.

The incentive/award module 316 may provide various incentives, awards, or recognition to users based on various aspects of hosting and/or receiving content 120. For example, the incentive/award module 316 may provide recognition of a host for the most visits by another user over some timer period, the total distance over which content 120 was transmitted to a visitor, the highest number of "likes" or positive comments from visitors regarding an item or stream of content 120. From the perspective of the visitor, recognition could be provided in light of the highest number of different hosts or "places" visited, the distances involved in those visits, and so on. In one example, recognition of these milestones may be published via the social network 110. The incentive/award module 316 may also provide or designate more substantive incentives or awards, such as cash awards or credits for employing the content-sharing service of the communication system 100.

Figure 4A:
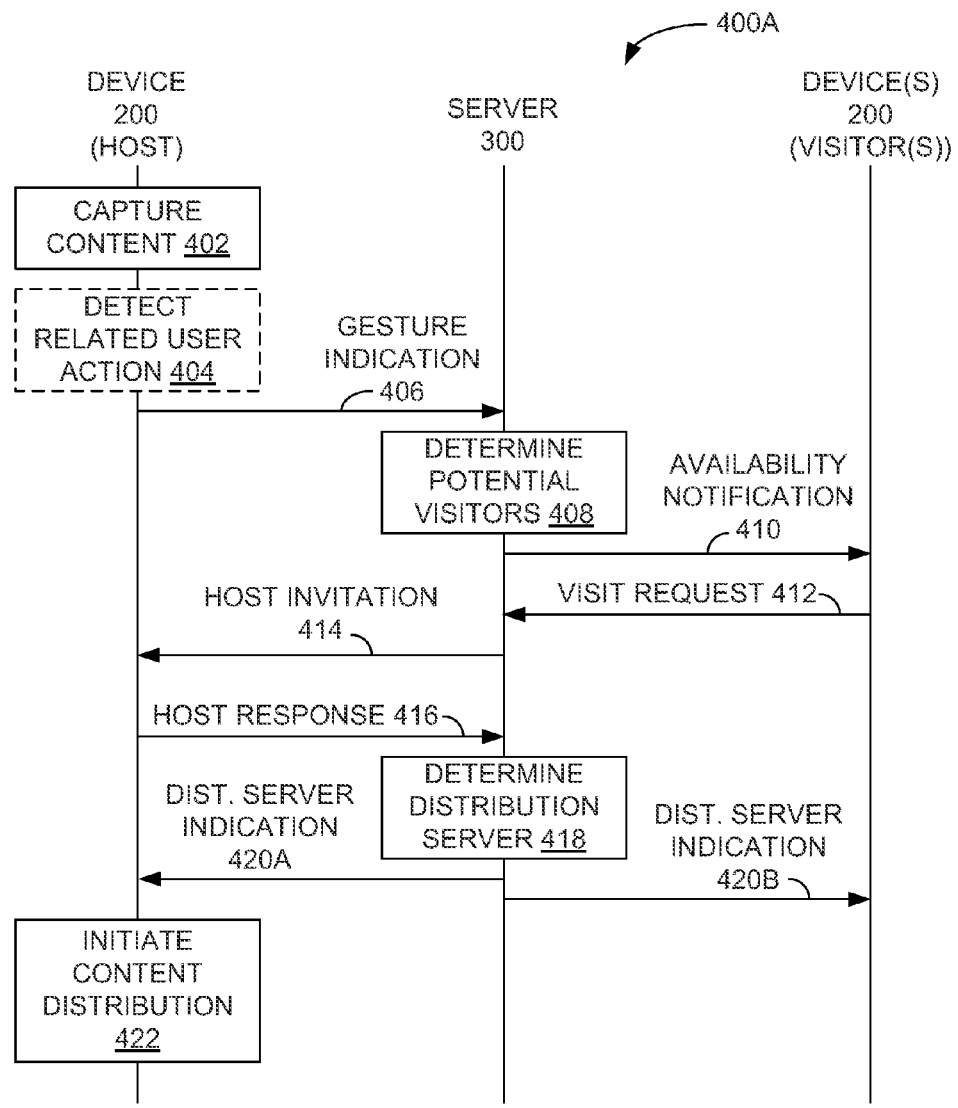
FIGS. 4A, 4B, and 4C are communication diagrams illustrating example methods for sharing content via social network interaction.
Figure 4B:
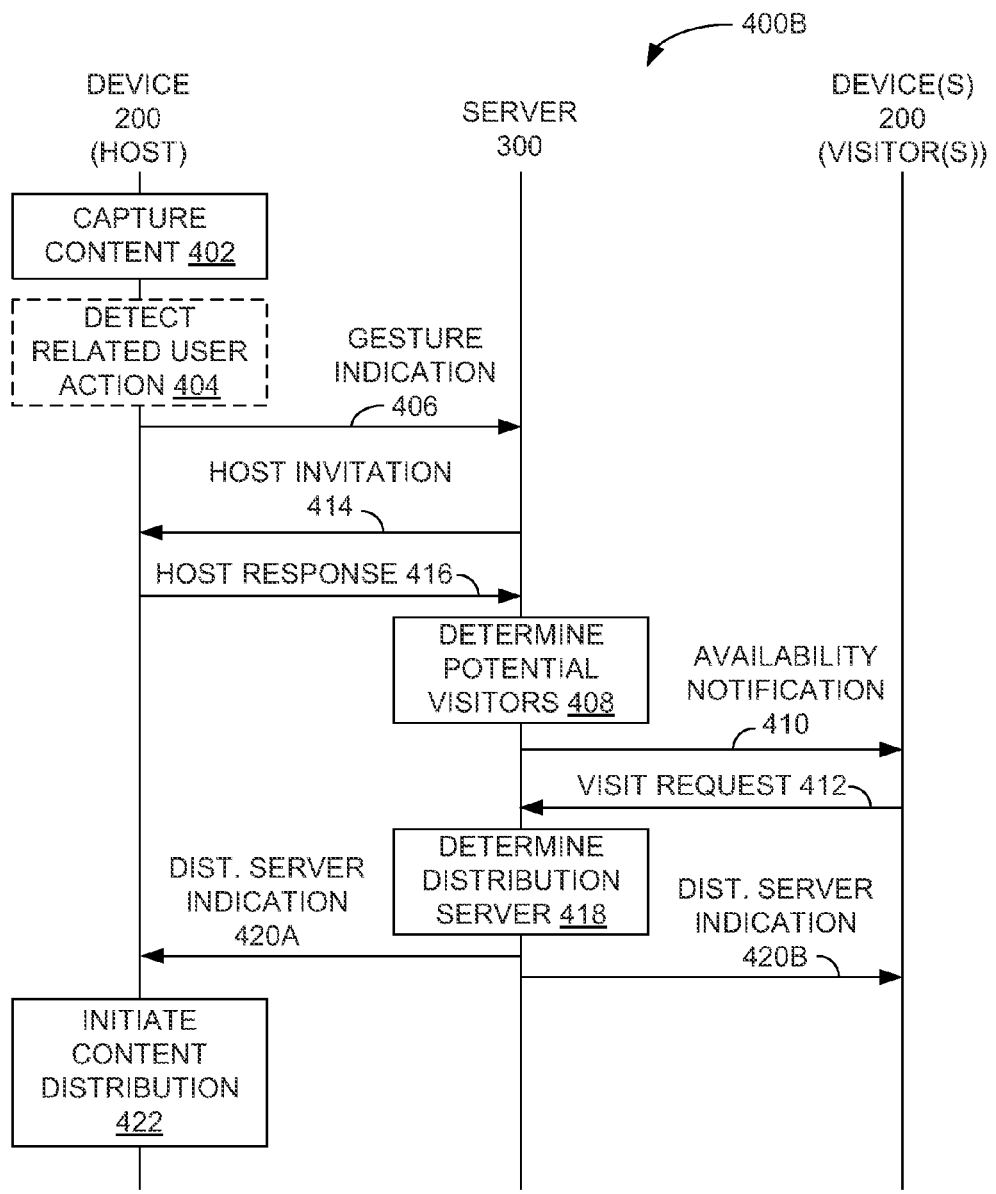
Figure 4C:
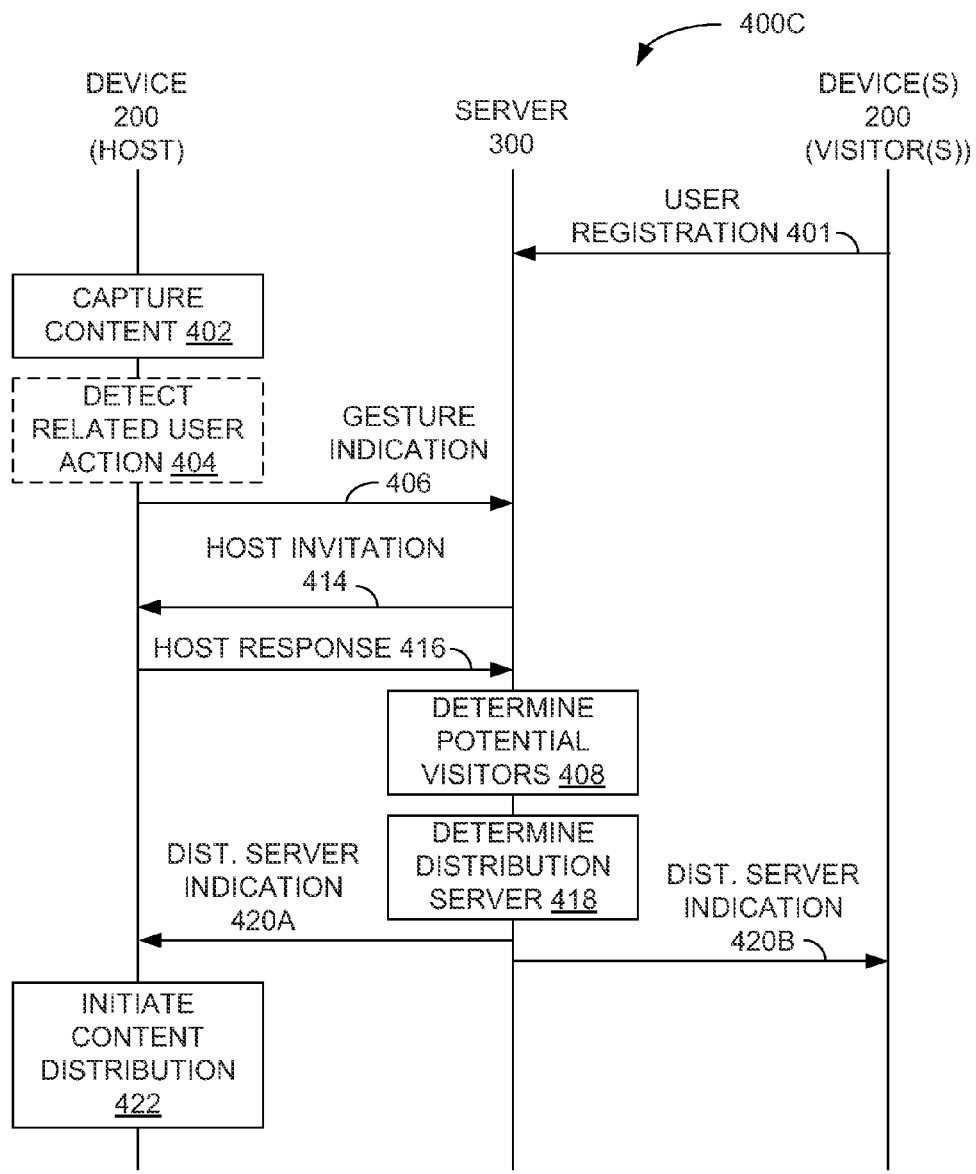

FIGS. 4A, 4B, and 4C are communication diagrams illustrating example methods 400A, 400B, and 400C (collectively, methods 400) for sharing content using notification through a social network, such as the social network 110 of the communication network 100 of FIG. 1. However, other communication systems utilizing different components or systems may employ the methods depicted in FIGS. 4A through 4C in other examples. Further, alternatives of each of the methods 400 may omit one or more operations and communications described in FIGS. 4A through 4C, or may add other operations and communications not shown therein. In addition, each of the methods 400 may be encoded as instructions on a non-transitory computer-readable storage medium, such as, for example, an integrated circuit, magnetic disk, or optical disk, which are readable and executable by one or more computers or other processing systems, such as the user devices 200 of FIG. 2 and the server 300 of FIG. 3.

In one example, prior to execution of the example methods 400 of FIGS. 4A and 4B, a plurality of user devices 200 may register for the ability to share content 120 in conjunction with the use of a social network 110. In one example, this registration may occur as the result of a software application being installed and executed on each of the user devices 200. Further, as a part of the installation process, the application may ask the user of the device 200 for information regarding, for example, the user, the user's involvement with the social network 110, and the interest level of the user in various types of content 120. Examples of the desired information, include, but are not limited to, the user's name and other identifying information, the user's identifier within the social network 100, and the formats, subject matter, and other characteristics of the user's favorite or desired content 120. Such information may be stored in the user device 200, the server device 300, or another device or database of the communication system 100 of FIG. 1. In some implementations, this information may also be used to gather further data regarding the historical habits of the user regarding the types of content 120 received, the particular time periods in which the user accessed the content 120, and the like. This information may be employed as described above to control or direct the sharing of content among the user devices 200. The method 400C of FIG. 4C denotes such a registration operation, which is described more fully below.

In the example method 400A of FIG. 4A, a device 200, under the direction of a user, captures or generates content 120 (operation 402), such as one or more still images, textual data, graphical data, audio data, and/or video data. In some examples discussed below, particular emphasis is placed on the sharing of a video data stream, but the scope of the embodiments described herein is not limited to video data.

In some examples, the user device 200 may also detect a user action related to the content 120 captured or generated (operation 404). While the user action is depicted in FIG. 4A as occurring after the capture of the content 120, such an order is not mandated, as the user actions may occur before and/or after the capture or generation of the content 120. Such an action may be termed a "gesture", which in one instance may serve as a trigger for the sharing of the content 120. Possible gestures may encompass any of a number of user actions, such as the changing of a geographic location, as detected by the location service module 204 and/or the environment detection module 206. In one implementation, a gesture may include the actual capturing or generation of the content 120, such as the taking of a photo or video, or the posting of the content 120 to the social network 110. In another instance, the gesture may be the initiation of some other action involving the social network 110, such as a social network status, comment or "like", friend request or acceptance, the creation of a photo album, or the like, that is not specifically related to the content 120 in the social network 110, possibly accompanied with a location "tag" or metadata. Furthermore, a gesture may be an action of another person connected to the social network 110, such as a friend or family member of the user of the device 200. Such actions may include the viewing of content 120 posted to the social network 110, the posting of content 120 to a portion of the social network 110 associated with the user (for example, the user's "wall"), comments regarding the user, and so forth. In another example, the gesture may be an explicit indication by the user via the user interface module 202 to share the content 120 as a host. Additionally, a gesture may include the hosting of content 120 to another visitor.

In response to capturing the content 120, and possibly also in response to some additional user action, the device 200 of the potential host transmits a gesture indication (operation 406) to a server 300. In one implementation, the gesture indication 406 indicates that the device 200 of the potential host has captured (or is in the process of capturing) content 120 that may be shared with visitors. In response, the server 300 determines potential visitors that may be interested in "visiting" the host (operation 408), thus receiving the captured or generated content 120. In one example, the server 300 employs information previously received from the social network 110 regarding friends, family members, and possibly others of the potential host, and use that information to identify the potential visitors. In addition, the server 300 may also employ user preference information of the potential visitors to further determine which of the potential visitors may have an interest in receiving the captured or generated content 120.

In response to determining the potential visitors, the server 300 may then transmit an availability notification (operation 410) to each of the potential visitors identified. As a result, a gesture by the potential host may be reflected in a notification to a potential visitor, such as a notification provided via the social network 110, or by way of an application executing on the user device 200 of the potential visitor. The availability notification, in one example, identifies the potential host in at least one of a number of ways, such as an individual host, as a current location of the potential host (for example, a city or neighborhood), an identity of a particular group in which the host is a member, and/or the nature of the content 120 to be shared. In one example, the availability notifications are provided through the application that provides the content-sharing capability on the devices 200. In a second example, the availability notifications are provided by way of the social network 110. After receiving the availability notification at their respective devices 200, those potential visitors interested in receiving the content 120 may initiate a visit request (operation 412) to be transmitted from the device 200 of the visitor to the server 300.

Responsive to receiving the one or more visitor requests, the server 300 may transmit at least one host invitation to the device 200 of the potential host (operation 414) for presentation to the potential host. In one example, the server 300 may transmit a single host invitation to the device 200 of the potential host when at least one potential visitor has issued a visit request 412. In another implementation, the server 300 may transmit a host invitation for each visit request received. The server 300 may also indicate the identity of each potential visitor in the host invitation 414.

In reply to the host invitation 414 presented to the potential host, the device 200 of the potential host may return a host response 418 to the server 300 (operation 416) at the initiation of the potential host. If the potential host decides not to fulfill the role of a host, the server 300 may then inform the devices 200 of the potential visitors that the content 120 will not be shared (not shown in FIG. 4A). If, instead, the potential host decides to become a host for the content 120, the server 300 may then determine or select one or more distribution servers by which to forward the content to the devices 200 of the visitors (operation 418). Such a selection may be based on a number of factors, including, but not limited to, the number of visitors to receive the content 120, the communication bandwidth required to transmit the content 120, and the communication capabilities of the communication network 106, the distribution servers, and the receiving devices 200. An example method by which the distribution server is selected is discussed below in conjunction with FIG. 5. In one example, the distribution server determination may be performed within the server 300, while in other cases, this operation may be provided by way of a separate device within the communication network 106 (FIG. 1). Furthermore, the server 300 may select one or more distribution servers from a dynamically generated list of servers.

Once the server 300 selects the one or more distribution servers, the server 300 may provide a distribution server indication to both the device 200 of the host (operation 420A) and the devices 200 for each of the visitors (operation 420B). In one example, the distribution server indications allow each of the devices 200 to engage in communication with the correct server to transmit or receive the content 120, as appropriate. In response to receiving the distribution server indication, the device 200 of the host initiates distribution of the content 120 via the indicated server (operation 422).

In some implementations, the content 120 distributed to the visitors may be the content 120 currently being captured and transmitted by the device 200 of the host. In other embodiments, the visitor may being receiving the content 120 at the beginning of the capture or generation of the content 120 after the content 120 has been stored or cached at the device 200 of the host, or on a server of the communication network 106. Further, the distribution of the content 120 may be controlled by each visitor via DVR-like commands, such as rewind, fast-forward, pause, and so on.

In another implementation, multiple different streams or items of content 120 from multiple hosts may be made available to one or more visitors. As such, the visitor may view the multiple streams or items of content 120 concurrently or simultaneously, such as by way of "tiled" or "picture-in-picture" view. In one example, the multiple sources of content 120 may reflect different angles or points of view of the same event or location.

In one example, visitors aware of the content 120, whether or not actually visiting the host, may inform their friends and other contacts via the social network 110 of the content 120 being hosted by another user. As a result, "friends of friends" not connected directly to the host of the content 120 also may become visitors of the host. Moreover, the "friends of friends" visitors may also notify additional friends of the same content 120. This notification process may continue indefinitely, possibly resulting in a large number of visitors for the host based on the social network 110. In other implementations, visits to one or more hosts may be open or available to most or any potential visitors, including, for example, anonymous users and users employing aliases or pseudonyms.

In an embodiment, any and/or all of the communications from the server 300 to the hosts 200, such as the availability notification (operation 410), the host invitation 414, and/or the distribution server indications (operation 420) may be issued according to a push notification mechanism, such as the Cloud-To-Device Messaging (C2DM) messaging framework provided by Google® Inc., or the device push notification channels supported by Apple® Inc.

FIG. 4B provides another example method 400B for the sharing of content 120 captured or generated at a potential host device 200. The method 400B is similar in several respects to the method 400A of FIG. 4A, described above. However, instead of waiting to issue the host invitation (operation 414) until at least one visit request has been received from a device 200 of a potential visitor, the server 300 transmits the host invitation in response to receiving the gesture indication 406 from the device 200 of the potential host. Thereafter, when an affirmative host response is received (operation 416) indicating that the potential host agrees to that role, the server then determines the potential visitors 408 (operation 408) and notifies the identified potential visitors accordingly (operation 410). In another example, if the host response (operation 416) indicates that the potential host does not wish to host visitors, the selection of potential visitors (operation 408) and the transmission of associated availability notifications (operation 410) need not occur.

In a related example, the issuance of the host invitation (operation 414) may occur prior to the capture of any content (operation 402). For instance, at least some of multiple devices 200 may produce gesture indications (operation 406) indicating their current location. Based on a particular location being of interest (say, the location of a newsworthy event), host invitations (operation 414) may be issued to those devices 200 corresponding to the location of interest. In a further embodiment, the host invitations (operation 414) may be issued to devices 200 that have not issued a gesture indication (operation 406), wherein the host invitation (operation 414) indicates a particular location of interest, requesting host responses (operation 416) from those devices currently positioned at the requested location. Thereafter, a user willing to serve as a host may begin the capture of content (operation 402) for transmission to one or more visitor devices 200.

FIG. 4C is a communication diagram of yet another example method 400C for content sharing. The method 400C is similar to the method 400B of FIG. 4B, except that no availability notifications (operation 410) and visit requests (operation 412) are transmitted or received. Instead, the user preferences and related information discussed above may specify the format and types of content in which a potential visitor is interested, as well as the potential hosts from which the user may receive the content 120. The server 300 may retrieve such information from the user by way of a user registration (operation 401), which may occur when the user first causes the application to be executed. As a result, the server 300 may determine the potential visitors (operation 408) for a particular item or stream of content 120 based on that information and proceed to determine the one or more distribution servers to be used (operation 418), and then provide distribution server indications to both the device 200 of the host (operation 420A) and the devices 200 of the visitors (operation 420B).

As mentioned above, with respect to user registration (operation 401), the user may indicate the types of content 120 of interest to the user, and other information relating to the content 120. For example, the user may designate the potential hosts in which he is interested (possibly termed as "following" that host), content 120 associated with a particular geographic area or region, content 120 representative of a particular topic, and content 120 that may be presented as part of a particular news feed. Furthermore, a selection of a particular type of content 120 may be conditioned by a time limit, such as for example, over the next day or week.

In other examples similar to those illustrated in FIGS. 4B and 4C, a host invitation (operation 414) and host response (operation 416) may not be necessary. For example, if the potential host of content 120 is an individual or an entity, such as a news organization, that is always willing to (or capable of) serving as a host for any new content 120 generated or received at the device 200 of the host, the informational exchange embodied in the host invitation and host response may be unnecessary. Thus, after the capture of content (operation 402) and/or the detection of a related user action (operation 404), thus causing a gesture indication to be transmitted to the server 300 (operation 406), the potential visitors may be determined (operation 408), the distribution server selected (operation 418), the distribution server indications issued (operation 420), and the content distribution initiated (operation 422), as discussed above.

In one implementation, potential visitors may be determined by way of presenting indications of potential items or streams of content 120 for selection by the potential visitors, such as by way of the social network 110. For example, a webpage associated with the social network 110 may present a number of "featured" items or areas of content 120, such as different types of news, sports, and the like, or different geographic areas, such as specific cities, states, or countries. After being presented with these options, the potential visitor may select one or more of the features items for reception and viewing. In one example, such selections may only apply to a one-time item of content 120, after which such selections may have no effect for that visitor.

In other examples, the determination of one or more distribution servers (operation 418) and the associated distribution server indications (operation 420) may not be implemented if the distribution servers are known in advance to the various devices 200 involved in the sharing of the content 120.

While FIGS. 4A, 4B, and 4C reflect separate devices 200 for hosts and visitors, a single device 200 may serve as both a host and a visitor for different items or streams of content 120. For example, the sharing of content between two devices 200 may occur simultaneously therebetween using the various concepts described above, although employing a device 200 as a host device and a visitor device is not restricted to a bidirectional, one-to-one sharing of content 120.

Figure 5:
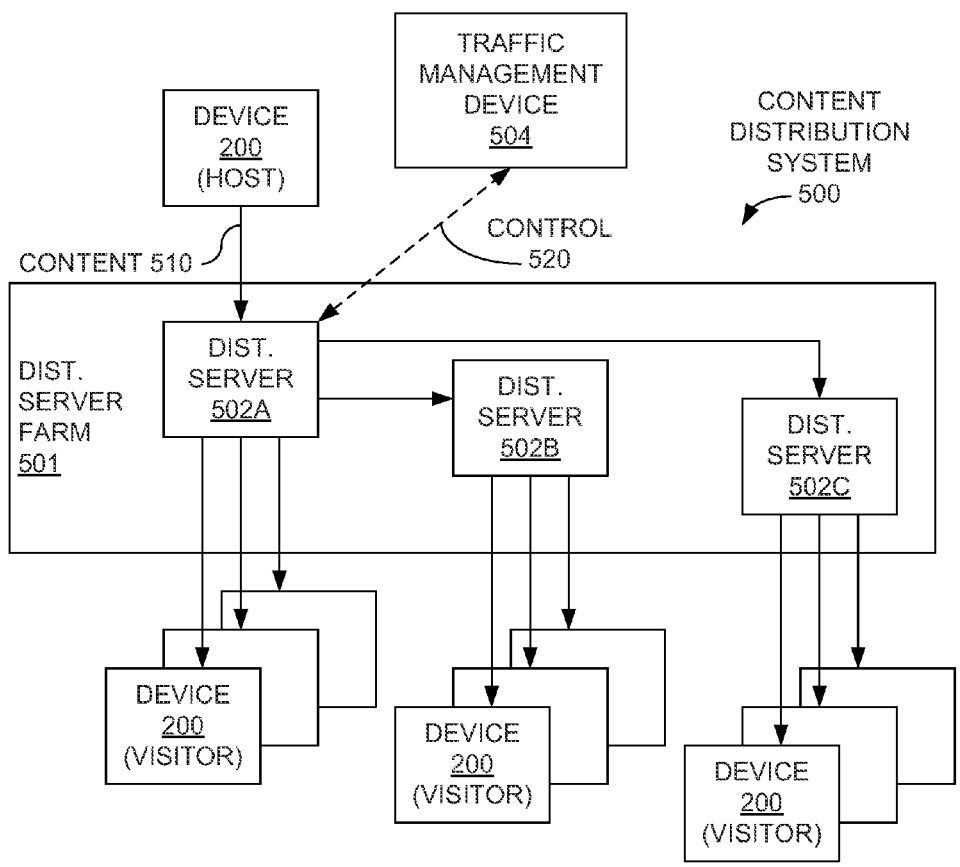
FIG. 5 is a block diagram of an example content distribution system associated with an example communication system.

FIG. 5 is a block diagram of an example content distribution system 500 in which the device 200 of the host transmits content 510 to a distribution server 502A, which in turn distributes the content 510 to one or more devices 200 for visitors of the host. In one example, the distribution server 502A is selected as part of the example methods 400A, 400B, and 400C of FIGS. 4A, 4B, and 4C, respectively (operation 422). As discussed earlier, the distribution server selection module 312 of the server 300 (FIG. 3) may perform the selection of the distribution server 502A. In other examples, other distribution servers 502B and 502C may be selected for distribution of the content 510 to other visitor devices 200 by either the distribution server selection module 312 or a separate traffic management device 504, shown in FIG. 5. Further, as described below, the distribution server selection module 312 in the server 300 (FIG. 3) or the traffic management device 504 may communicate with the distribution server 502A by way of a control connection 520 to determine whether more or fewer distribution servers may be desirable for distributing the content 510. In the implementation depicted in FIG. 5, the multiple distribution servers 502 may constitute at least a portion of a distribution server farm 501. While the server farm 501 of FIG. 5 explicitly illustrates only three distribution servers 502, a higher number of such servers 502 may be included in the server farm 501 in other embodiments.

In one implementation, the first distribution server 502A may be termed a "canonical server" for its status as the primary distribution server employed for sharing of the content 510. In one example, the canonical server 502A may not be capable of distributing the content 510 (for example, an audio/video stream) to each of the visiting devices 200. As a result, the canonical server 502A may keep the traffic management device 504 apprised of the visitor devices 200 currently receiving the content 510, as well as any other information that may aid the traffic management device 504 in enlisting another distribution server 502B, 502C into service for the distribution of the content 510.

In one example, the canonical distribution server 502A may be transferring multiple streams of content 510 simultaneously, with no other distribution servers 502B, 502C involved. While performing these transfers, the canonical distribution server 502A may determine that the number of visitor devices 200 receiving a particular stream of content 510 has increased beyond a predetermined threshold. In response, the canonical distribution server 502A may inform the traffic management device 504 of the condition, causing the traffic management device 504 to instruct the canonical server 502A to assign one or more of the remaining distribution servers 502B, 502C to additional visitor devices 200 requesting the content 510. In one example, the traffic management device 504 determines and informs the canonical server 502A which of the remaining distribution servers 502B, 502C are to be used. Such information may be based on random selection, consideration of current traffic levels regarding the content 510, and other factors.

In response to the selection of at least one additional distribution server 502B, 502C, the canonical server 502A directs the incoming content 510 to the selected distribution server 502B, 502C. In one implementation, the canonical server 502A establishes a proxy connection with the selected distribution server 502B, 502C, thereby accessing the selected distribution server 502B, 502C as a pseudo-visitor device 200. In addition, the canonical distribution server 502A, the traffic management device 504, the original server 300, or another device informs each newly-joining visitor device 200 of the identity of the distribution server 502B, 502C assigned thereto.

As a result, the canonical distribution server 502A acts as the single receiving point for the content 510 from the host device 200. In addition, the canonical server 502A then delivers the content 510 directly to one or more visitor devices 200, and may direct the content 510 to one or more additional servers 502B, 502C, which in turn transfer the content 510 directly to additional visitor devices 200. Therefore, the maximum number of distribution servers 502 separating the device 200 for the host and each of the devices 200 of the visitors may be two, thereby reducing the overall latency incurred in the transmission of the content 510.

Thereafter, as fewer visitors decide to continue to receive a particular stream of content 510, the number of distribution servers 502 utilized to forward the content to devices 200 of the visitors may be reduced accordingly, possibly to the point at which the canonical server 502A is only forwarding the content 510 directly to a number of devices 200 instead of also forwarding the content 510 to one or more of the remaining distribution servers 502B, 502C of the server farm 501.

FIGS. 6A through 6J provide screen views 600A through 600J of an example user interface of a user device 200 as provided by an application that facilitates the sharing of content among users of a social network, as described above. In the following examples, the user interface is provided by an application executing on a mobile device, such as a "smart" phone or PDA, although the same or similar applications for content sharing may be executed on other hardware platforms, such as desktop and laptop computers, table computers, game systems, televisions, and so on.

Figure 6A:
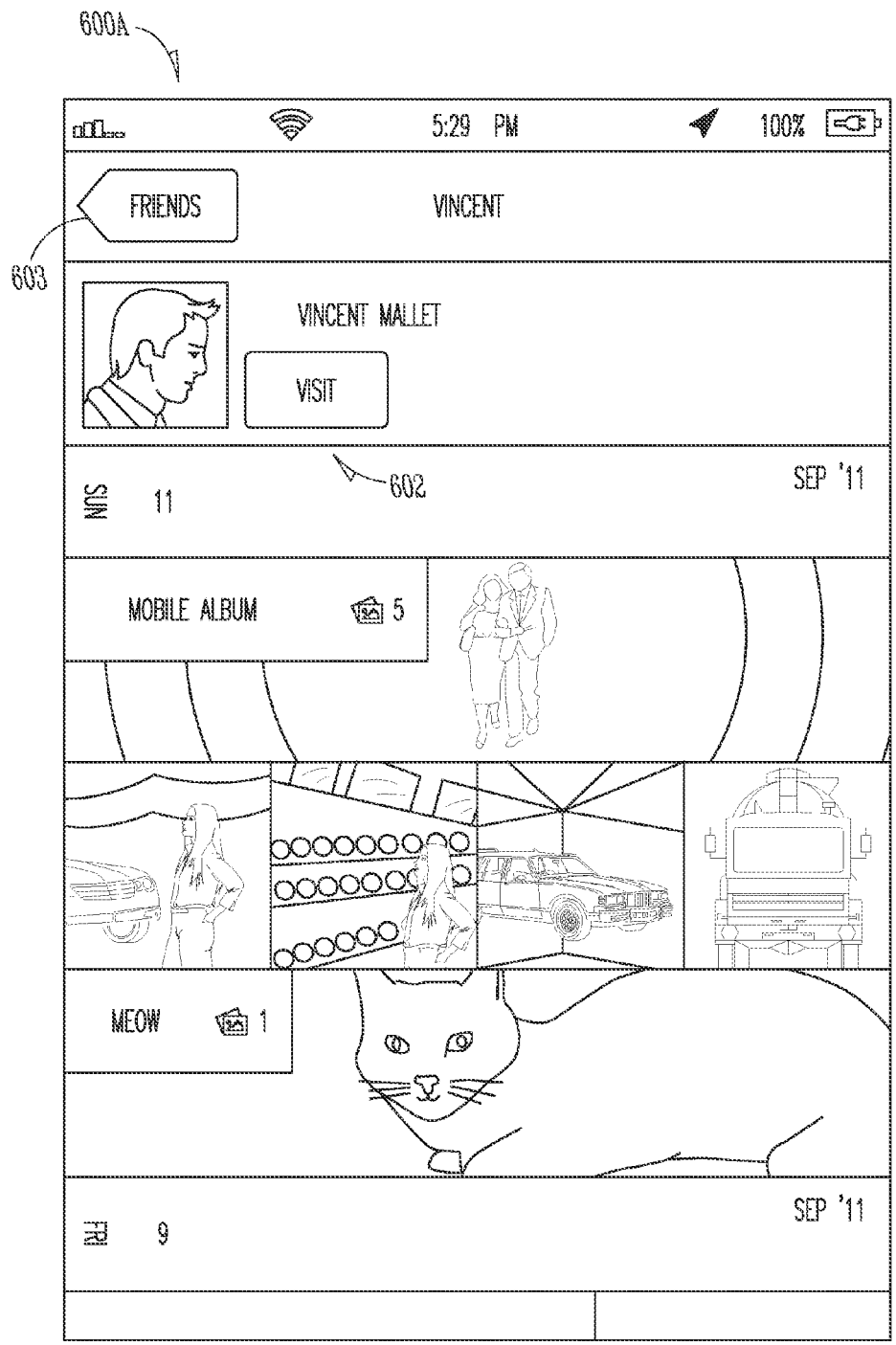
FIGS. 6A through 6J are example screenshots of an example user interface of an example application executing on a host and/or visiting device for the sharing of content.

FIG. 6A exhibits an example screen view 600A displayed on a device 200 for a potential visitor. In one example, the screen view 600A represents a "profile" page of the user, which displays a "visit" button 602 for a specific friend of the user. In one example, the profile page shown in FIG. 6A is accessed by way of a preceding "friends" list listing the friend shown in the screen view 600A, along with other friends of the user of the device 200. To return to the friends listing, the user may simply activate the "friends" button 603 shown in the screen view 600A. In the specific example of FIG. 6A, the screen view 600A may also display various items of content, such as individual photos, a photo album, still images from video clips, and the like.

Figure 6B:
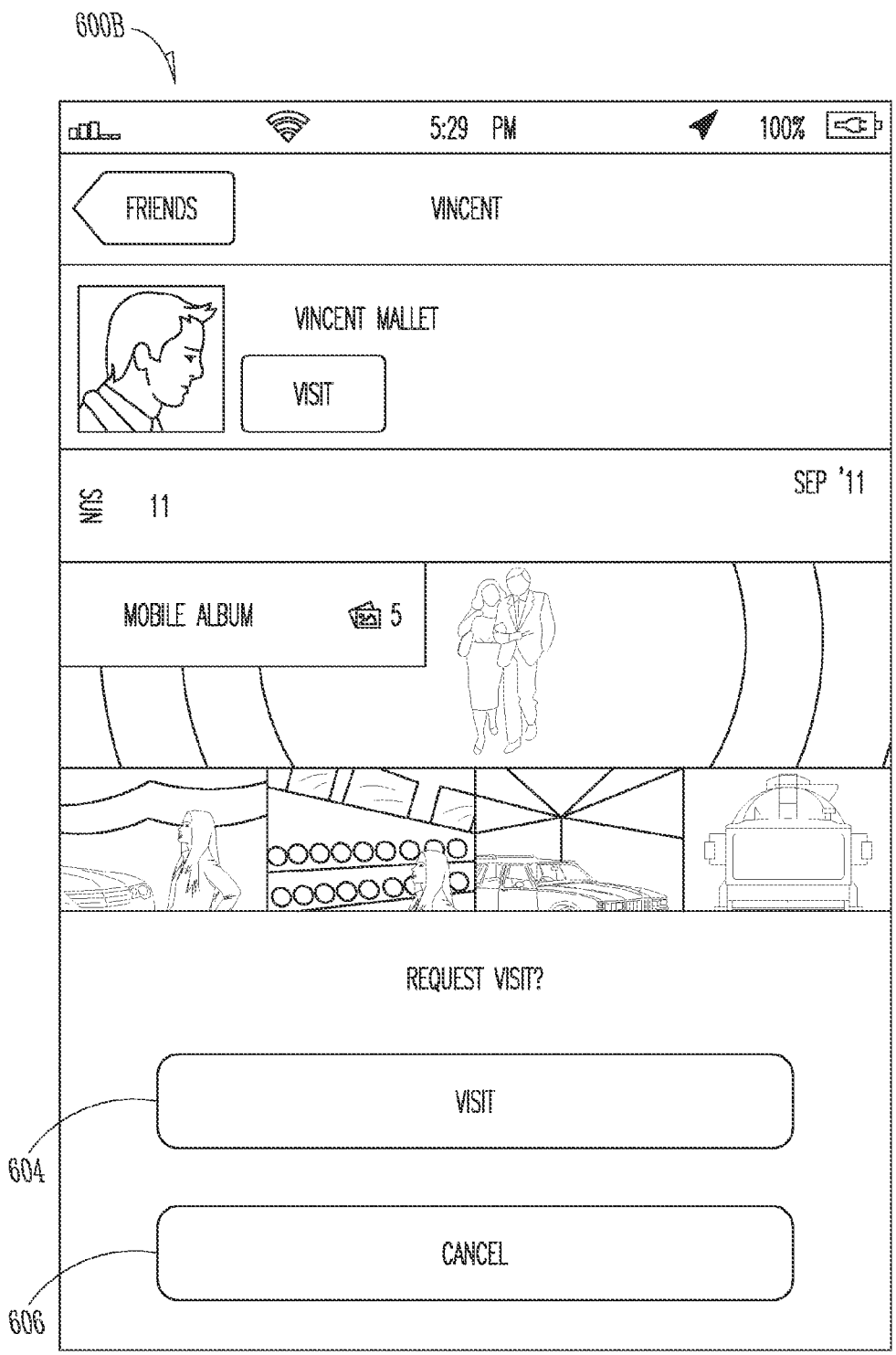

Presuming the user of the device 200 activates the "visit" button 602 shown in the screen view 600A, the application produces a confirmation page, shown in a screen view 600B of FIG. 6B. The screen view 600B provides a "visit" confirmation button 604 for confirming the request to visit the friend, and a "cancel" button 606 to cancel the request.

Figure 6C:
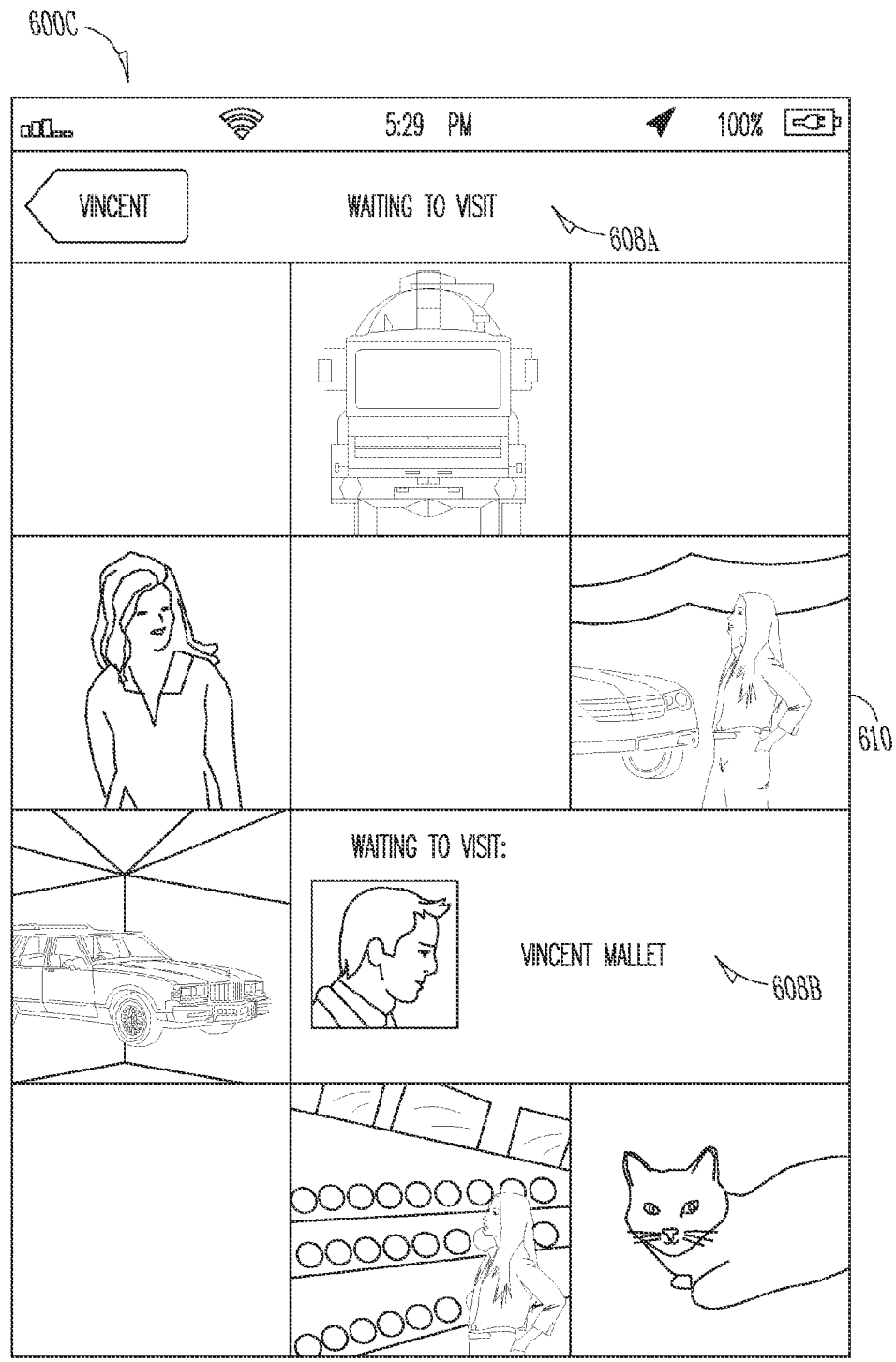
Figure 6D:
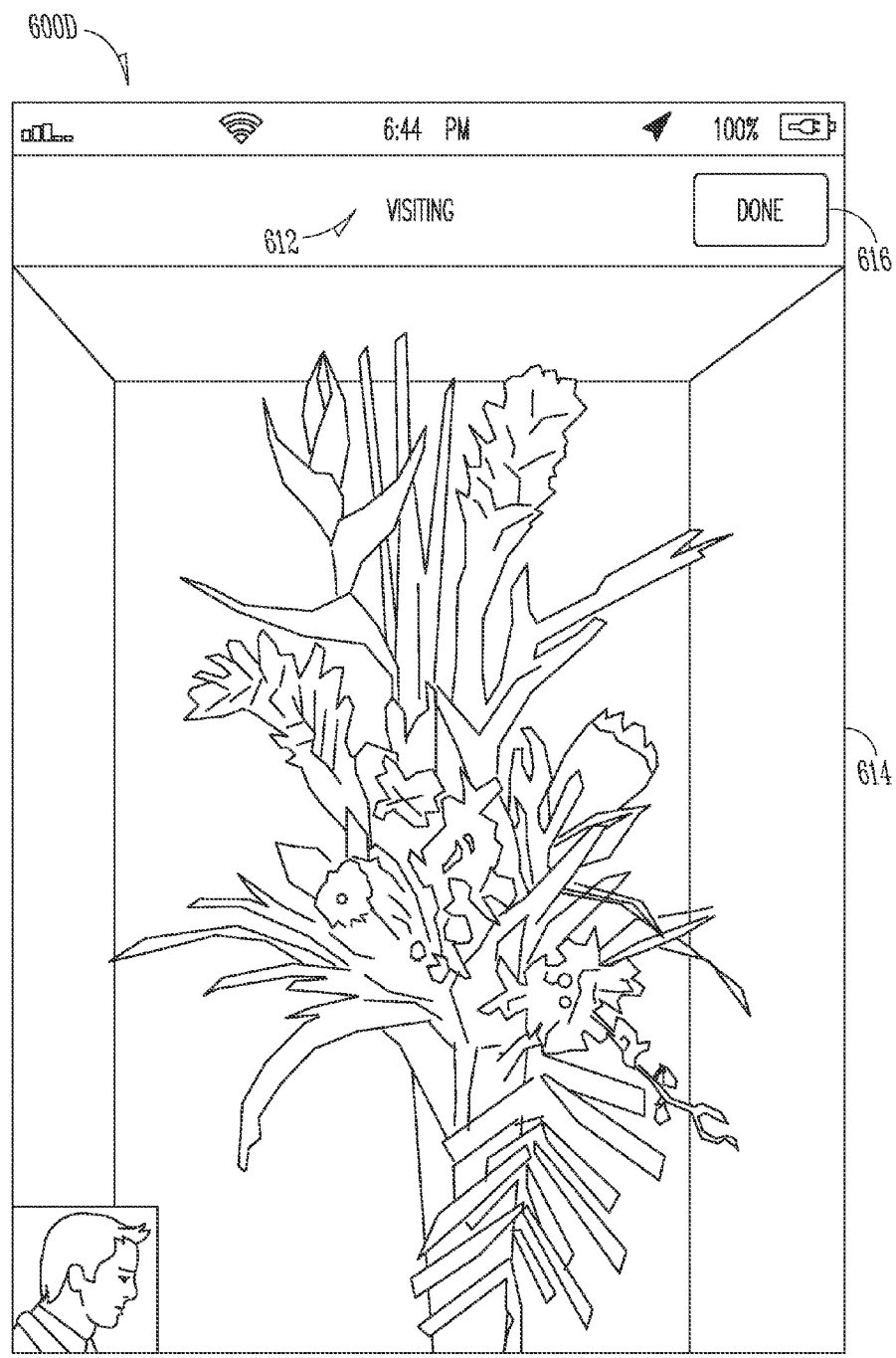
Figure 6E:
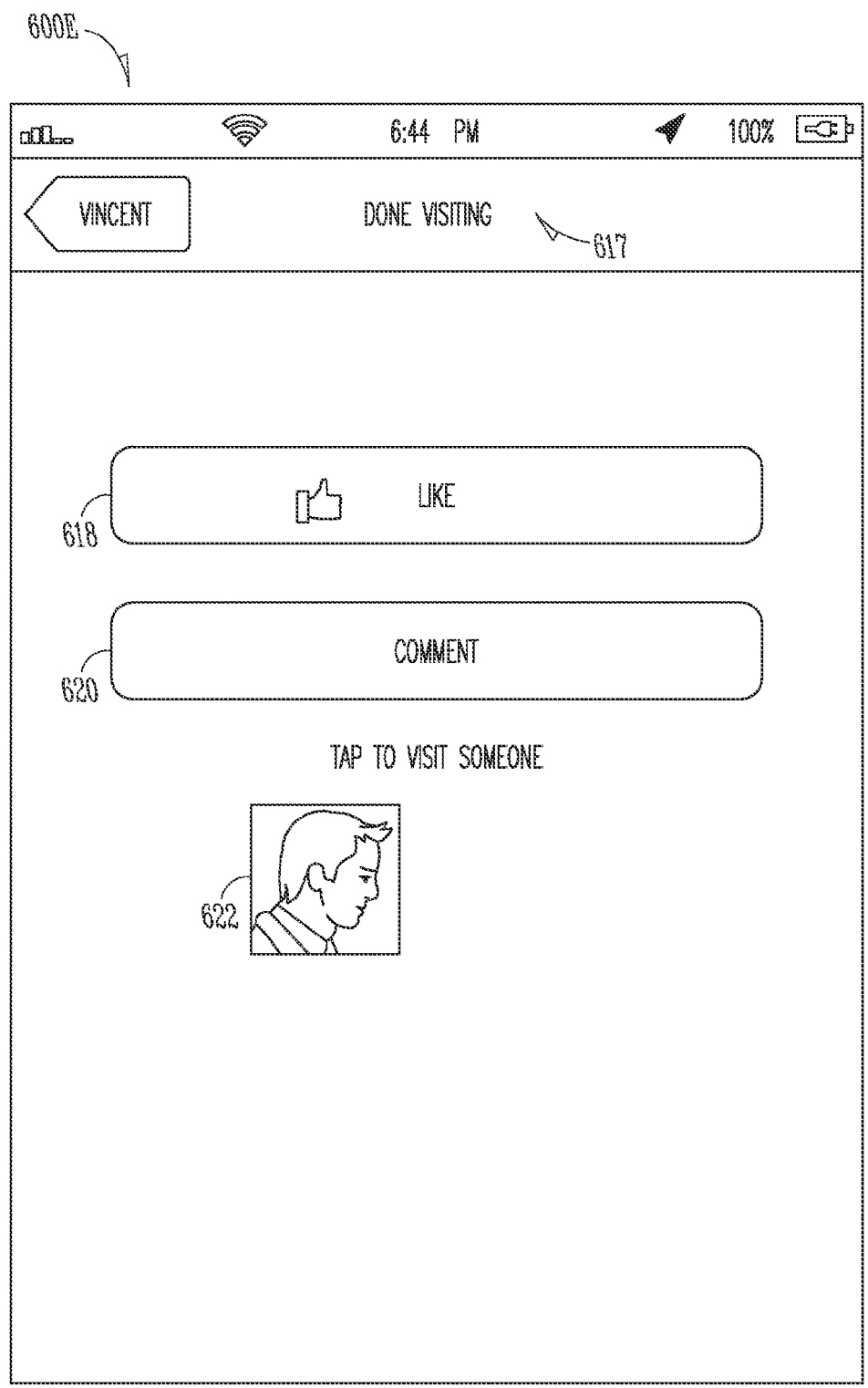

Presuming the user activates the "visit" confirmation button 604, the device 200 may present the screen view 600C of FIG. 6C, which informs the user by way of one or more status indicators 608A, 608B that the device 200 has sent the visitation request, and is awaiting approval of the requested visit. In the example of FIG. 6C, the screen view 600C may also display photo albums 610 and/or other content of the user.

Once the device 200 has received approval for the visit, content from the friend, serving as the host for the visiting user, is displayed to the user. As depicted in the screen view 600D of FIG. 6D, content 614 (in this case, a video stream) is presented to the user, and a visiting indicator 612 is displayed to remind the user that the device 200 is in a visiting mode. To terminate the visiting mode, the user may simply activate a "done" button 616 displayed in the screen view 600D.

Once the visiting mode is terminated, the user may be presented with a screen view 600E (presented in FIG. 6E) confirming termination of the visitation by way of a "done visiting" indication 617. In addition, the user may indicate its view of the content by way of "liking" the content on the social network 110 (FIG. 1) via a "like" button 618 or commenting on the content by activation of a "comment" button 620 that provides the comment on the social network 110. In addition, the screen view 600E may present profile photos 622 of one or more friends which, when activated, may cause the device 200 to present a screen associated specifically with the selected friend to allow the user to visit that friend.

Figure 6F:
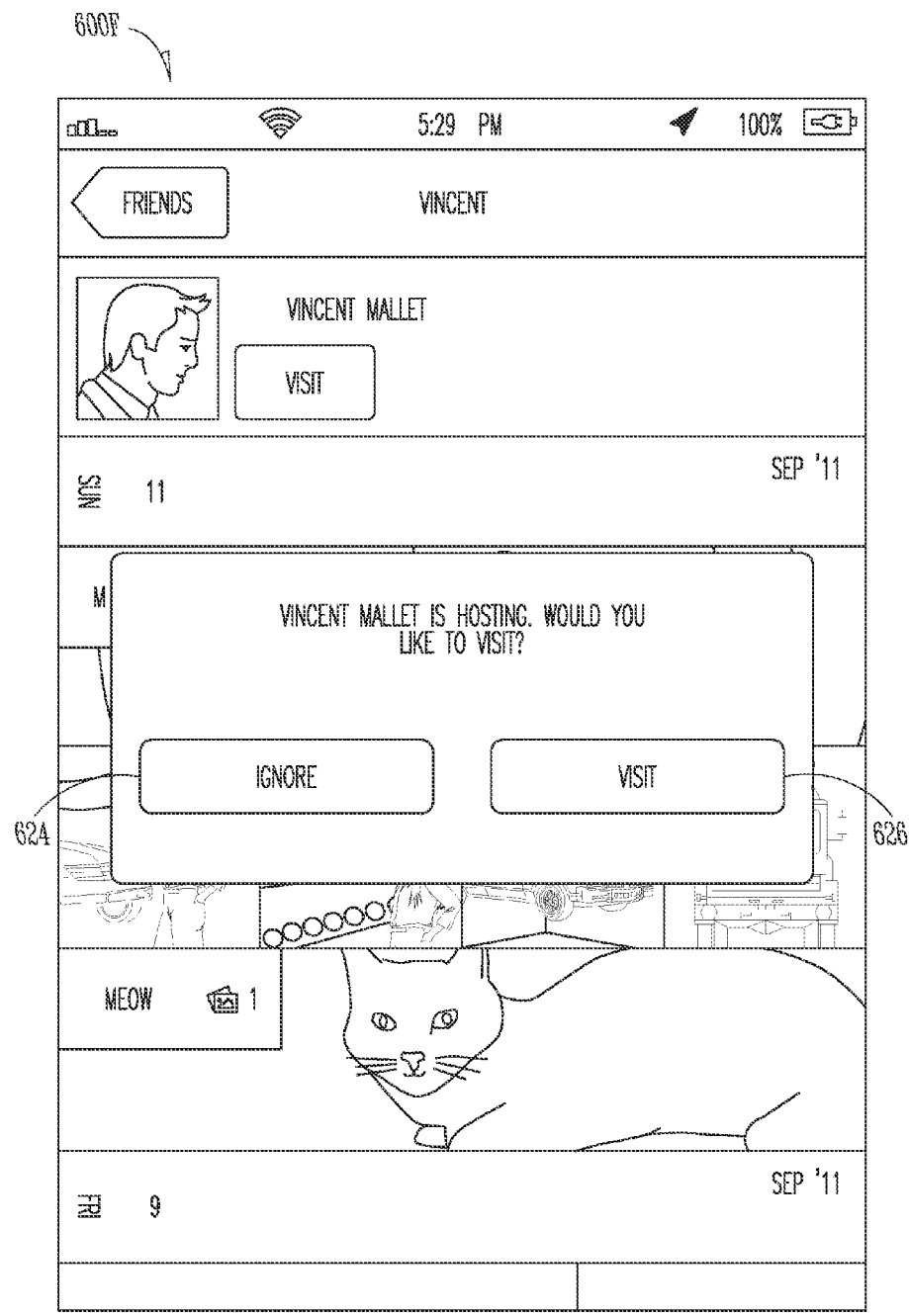

In a separate example, FIG. 6F presents a screen view 600F seen by the potential visiting user when using the application. The screen view 600F indicates that a friend has begun hosting content, and asks if the user would like to visit or ignore the friend by way of a "visit" button 626 and an "ignore" button 624, respectively. In one example, if the user activates the "visit" button 626, the user may be presented with the screen view 600C of FIG. 6C, informing the user that the device 200 is awaiting approval to visit the friend.

Figure 6G:
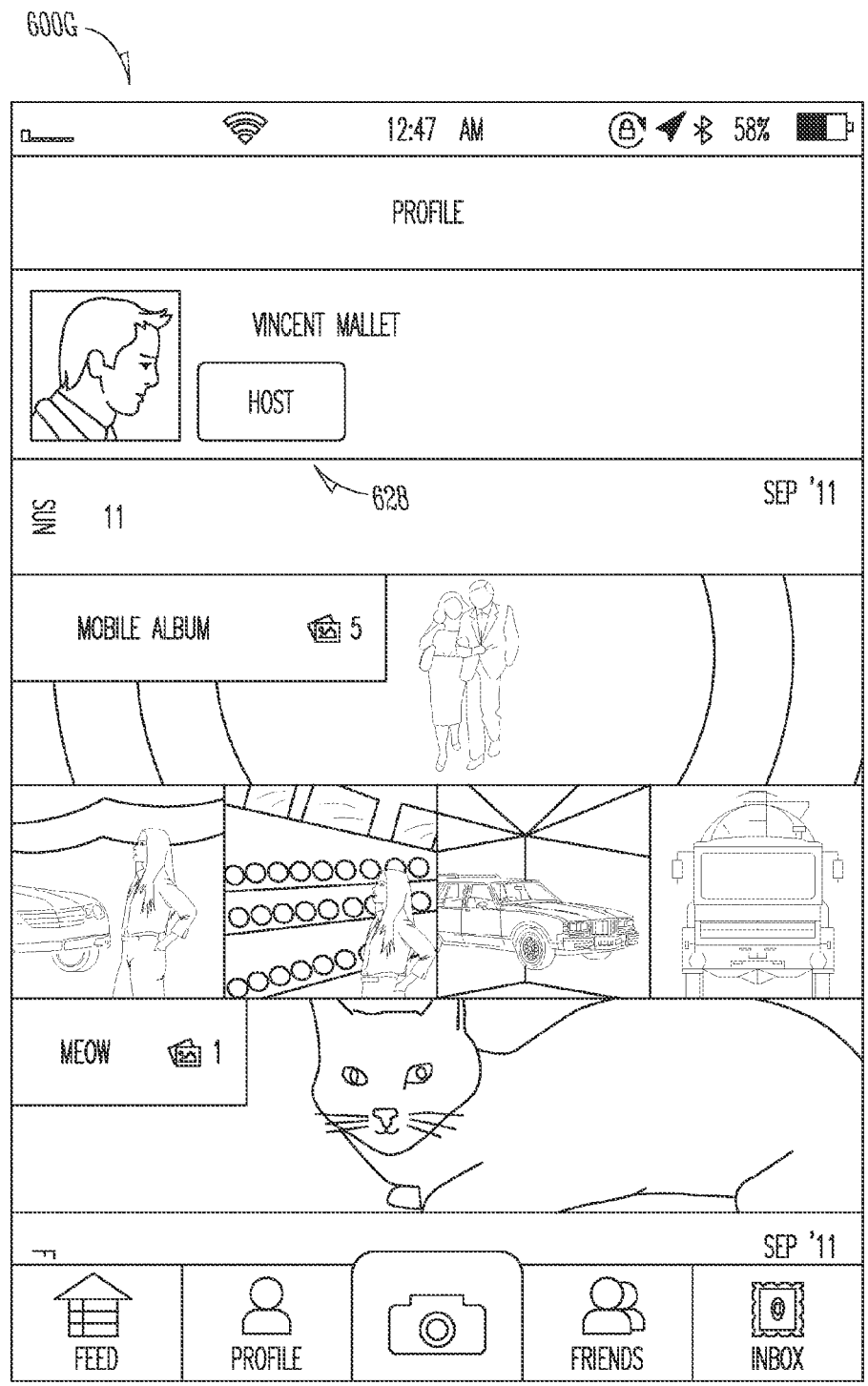

While FIGS. 6A through 6F describe various screen views 600A through 600F that may be presented to a potential visitor, FIGS. 6G through 6J present screen views 600G through 600J from the perspective of a potential host. For example, FIG. 6G presents a screen view 600G of the potential host's profile page, which provides a "host" button 628 that, when activated, initiates the process of placing the device 200 of the host in a hosting mode, thus transmitting content to those visitors that are interested in the content.

Figure 6H:
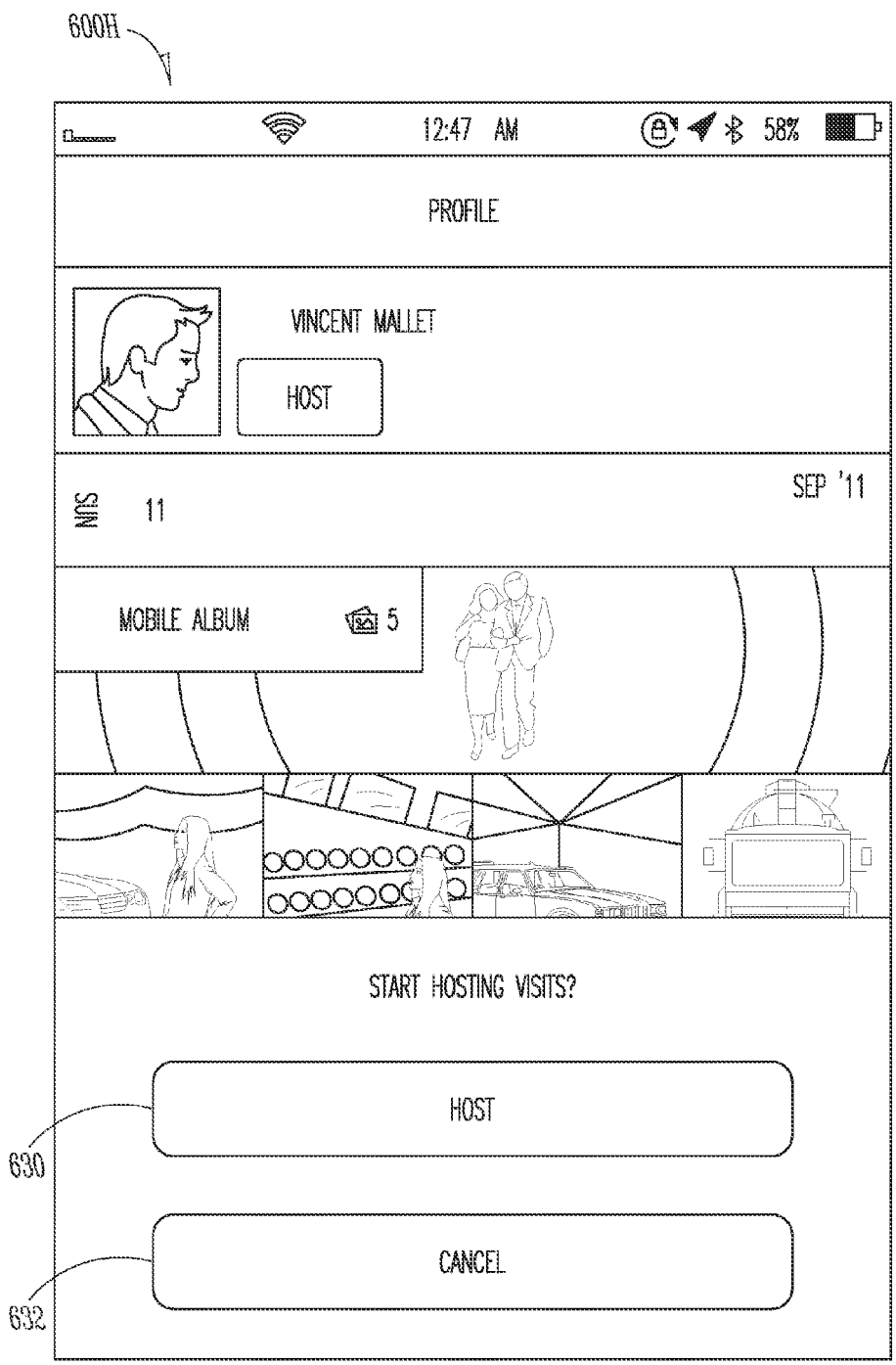
Figure 6I:
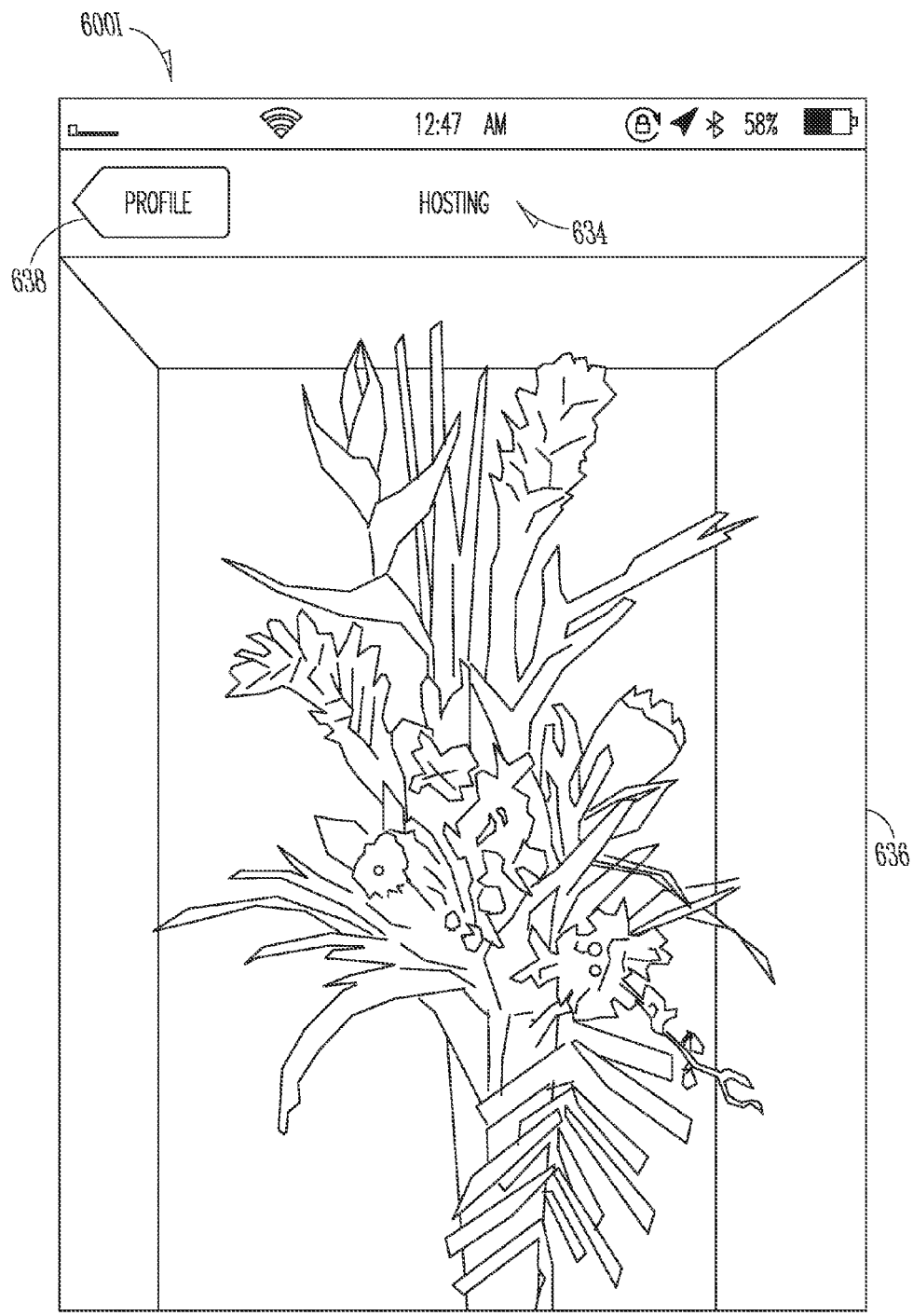
Figure 6J:
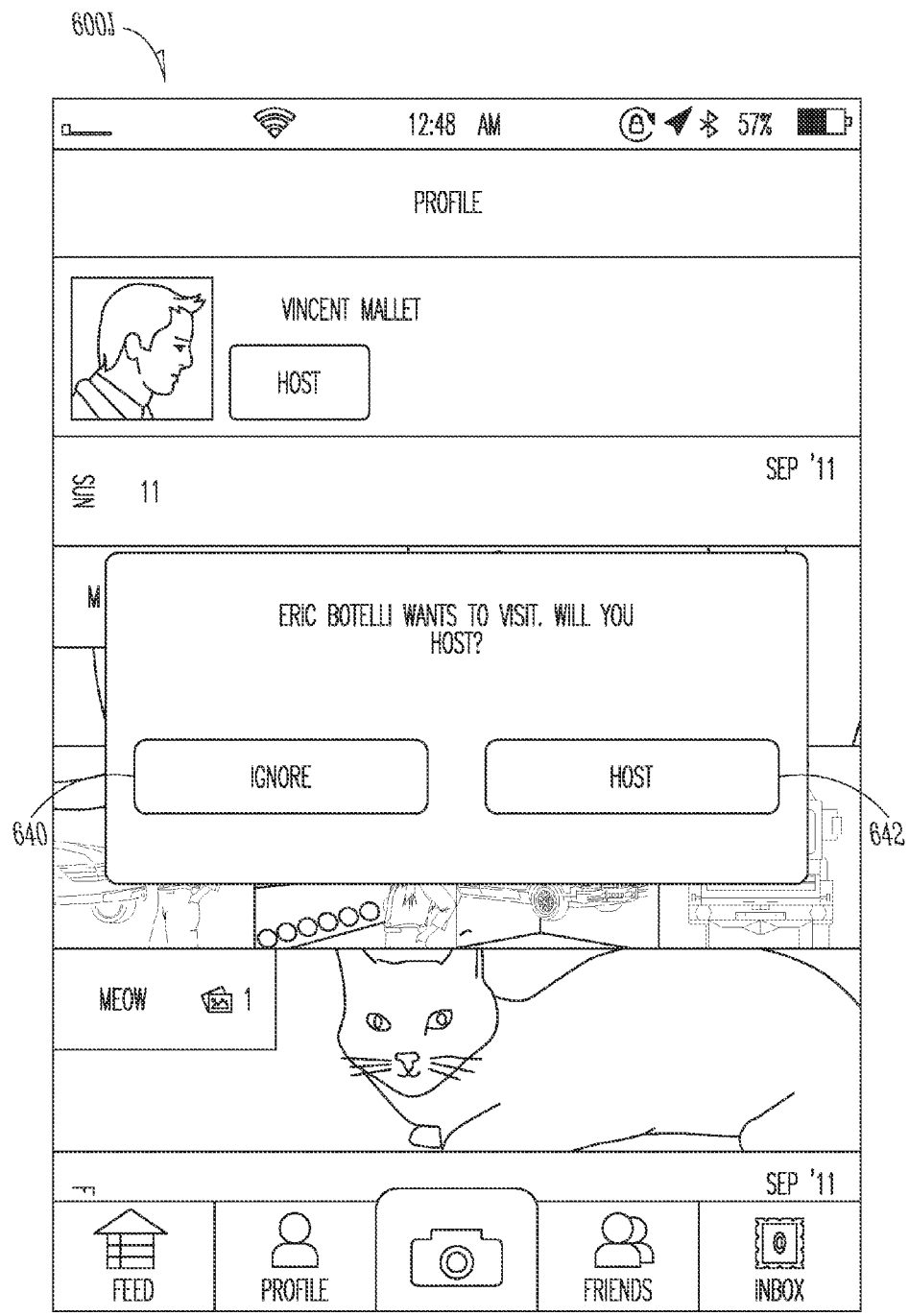

Upon activation of the "host" button 628, a screen view 600H of FIG. 6H requests confirmation by presenting a second "host" button 630 and a "cancel" button 632. In one example, cancellation of the hosting request returns the user to the profile page screen view 600G of FIG. 6G.

If, instead, the user activates the second "host" button 630, the device 200 of the host begins a hosting session, and presents a screen view 600I (shown in FIG. 6I) displaying the content 636 that the host is presenting to other users. The screen view 600I also provides a "hosting" indicator 634 to ensure the user is aware that he is broadcasting to others, and also displays a "profile" button 638 that would return the user to the profile page of screen view 600G of FIG. 6G, thus ending the hosting session. In one example, those friends actually visiting (i.e., receiving the content 636) may be denoted on the screen view 600I, such as by way of photos or icons associated with each of the friends visiting.

Presuming the host has activated the "profile" button 638 of the screen view 600I, the device may present the "profile" page of the user in response. At some point thereafter, the user may then receive a request from a friend to begin hosting another session. To indicate the request, the device 200 of the host may present a screen view 600J shown in FIG. 6J, in which the requesting friend is identified, a "host" button 642 is presented to allow the host to begin the session, and an "ignore" button 640 is provided to allow the host to ignore the request. Presuming the host activates the "host" button 642, the device 200 may present another hosting confirmation screen view, such as the screen view 600H of FIG. 6H.

In the examples noted above, a device 200 may receive information regarding who is hosting, who is visiting, and so on by way of information passed between the server 300 and the devices 200 by way of the separate notification channel described above.

Figure 7A:
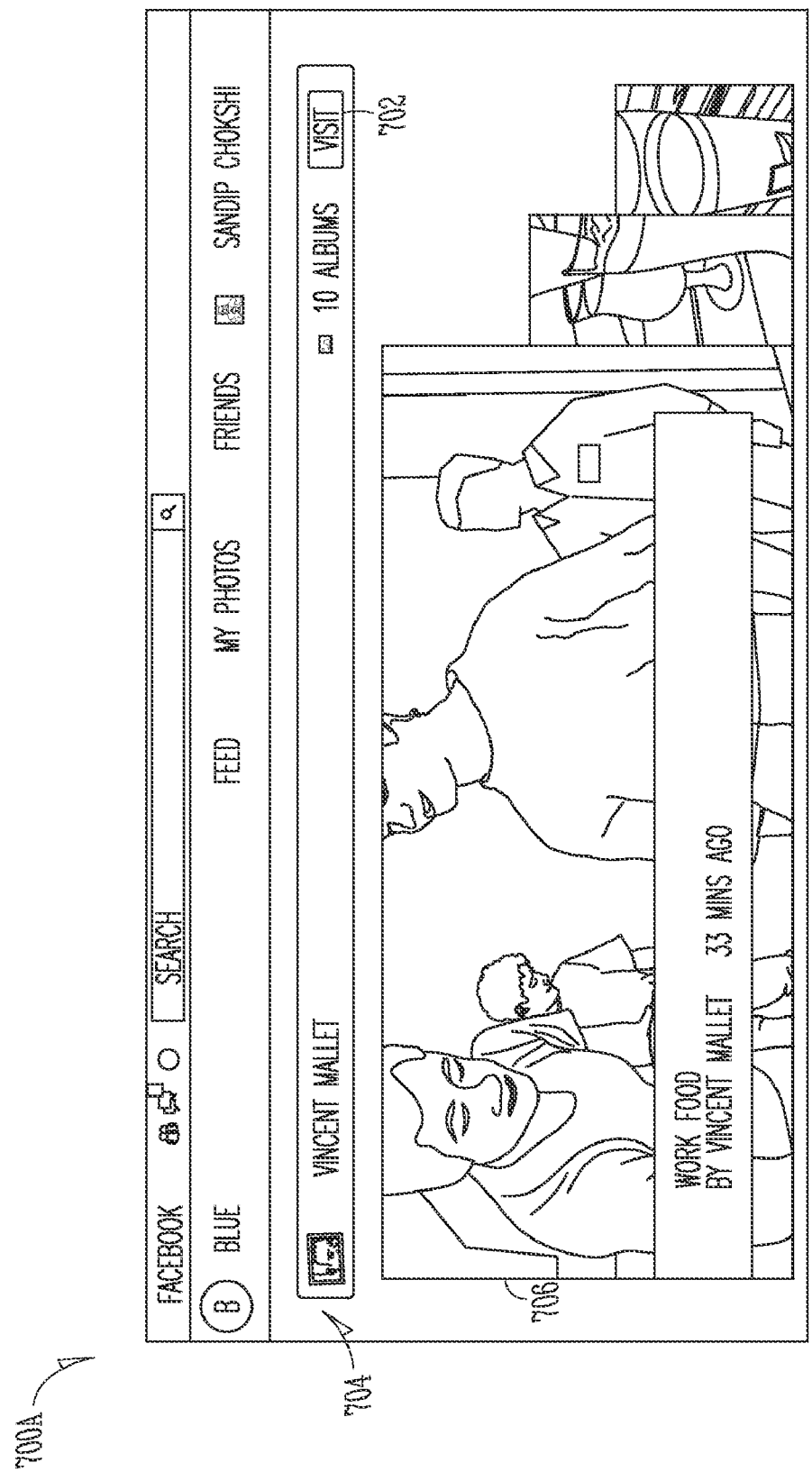
FIGS. 7A through 7O are example screenshots of an example web-based user interface being viewed on a visiting device for the sharing of content.

FIGS. 7A through 7O provide screen views 700A through 700O of example web-based user interfaces presented by way of a web browser for visiting a host in a variety of ways. More specifically, FIGS. 7A through 7D, FIG. 7N, and FIG. 7O present screen views of a content-sharing application (referred to in the drawings as "Blue", developed by Color Labs, Inc.) as embedded in a "canvas" of a social networking webpage (in this case, Facebook). FIGS. 7E through 7M depict screen views of the social networking website not involving the use of the embedding environment. In other examples, the content-sharing application may be accessed as a web application directly outside of the social networking context.

FIG. 7A presents an example screen view 700A of the content-sharing application embedded within a social network webpage, with the application supplying a profile page providing a potential host indication 704 with an associate "visit" button 702 that, when activated, initiates a process in which the user may visit the indicated host. As shown in FIG. 7A, the screen view 700A may also provide one or more "album" summary areas 706, in which the album may include multiple items or streams of content for viewing.

Figure 7B:
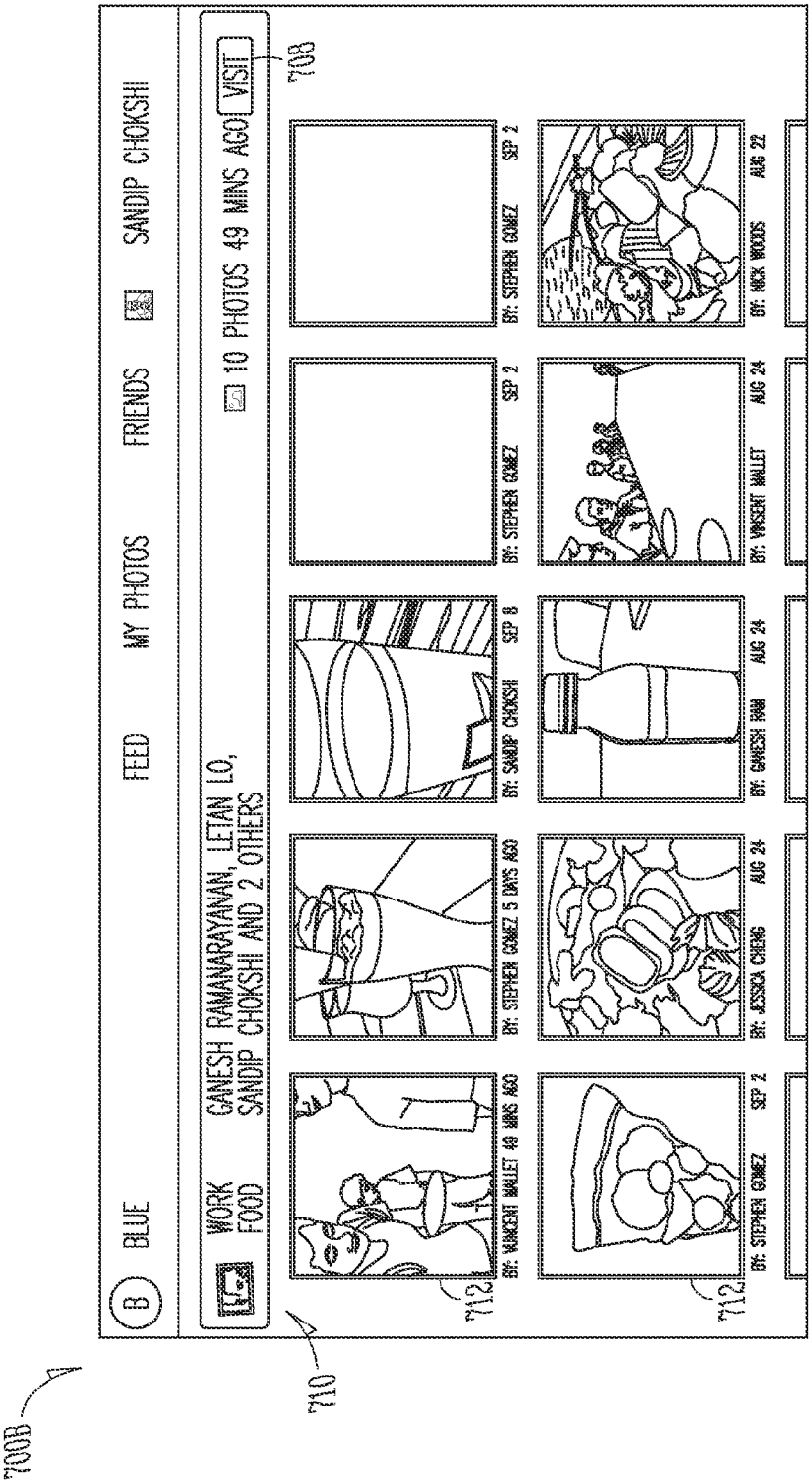

Similarly, FIG. 7B illustrates an example screen view 700B of a webpage for an album. In one example, this webpage may be accessed by way of activating the album summary area 706 of the screen view 700A of FIG. 7A. In the screen view 700B, the album title 710 ("Work Food") is presented, along with the individual content items 712 that may be activated for viewing. Also provided is another "visit" button 708 that, when activated, will initiate a process by which the user may visit at least one of the listed potential hosts.

Figure 7C:
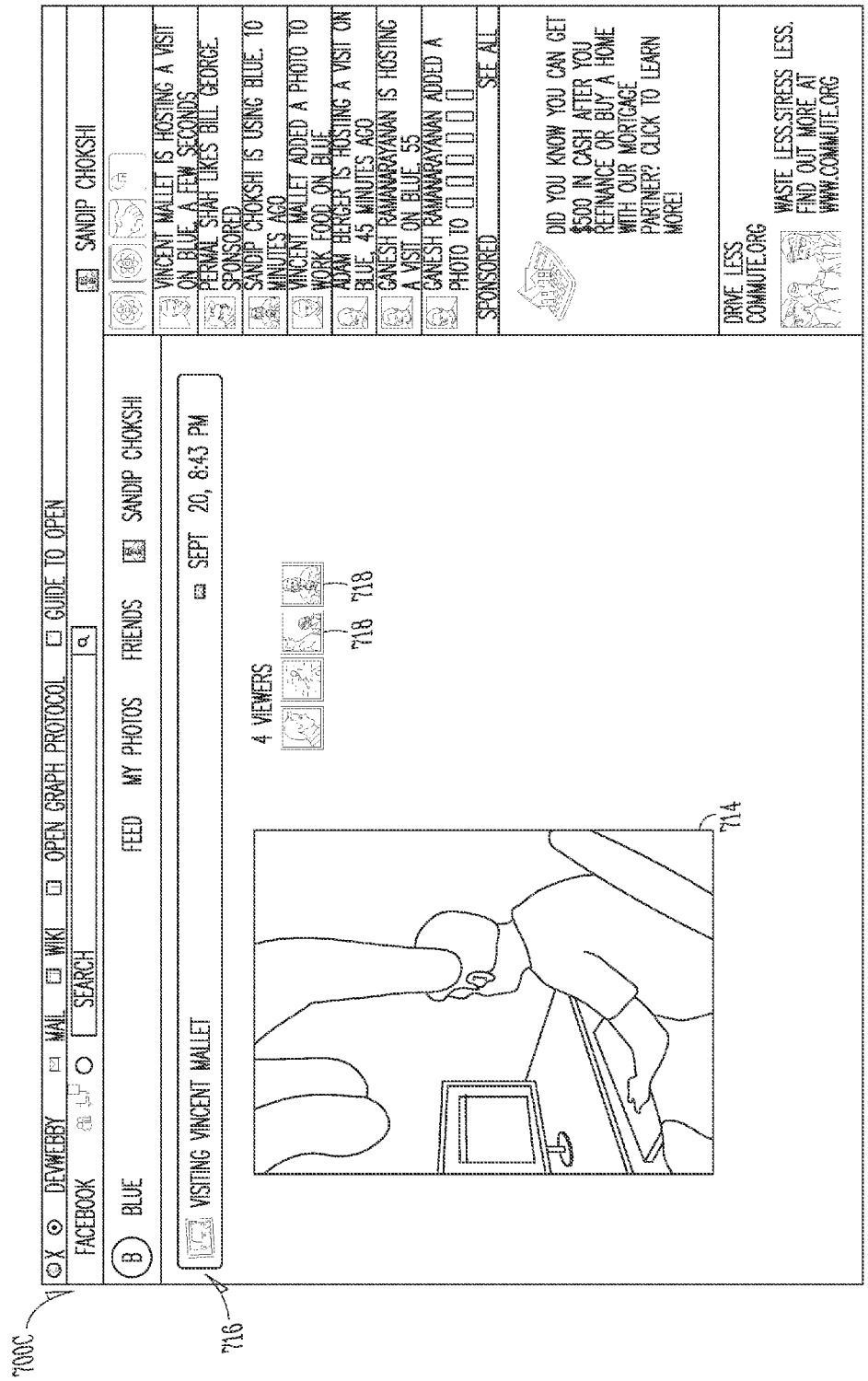

Presuming the visitation process has been initiated by activating one of the "visit" buttons 702, 708, as described above, the application may present the screen view 700C of FIG. 7C. Therein, content 714 may be presented to the visiting user, thereby experiencing what the host is experiencing. In the screen view 700C, the identity of the host, and an indication that the visitation is in progress, may be provided in a title area 716. In one example, the identity of each of the visitors may also be presented by way of an icon 718 or photo corresponding to each of the visitors. In one example, this information may be provided in the screen view 700C in real-time by way of a push notification channel, such as one that may employ a "hanging Get" protocol. In one implementation, the content 714 may be presented to the user via the Motion JPEG (M-JPEG) format.

Figure 7D:
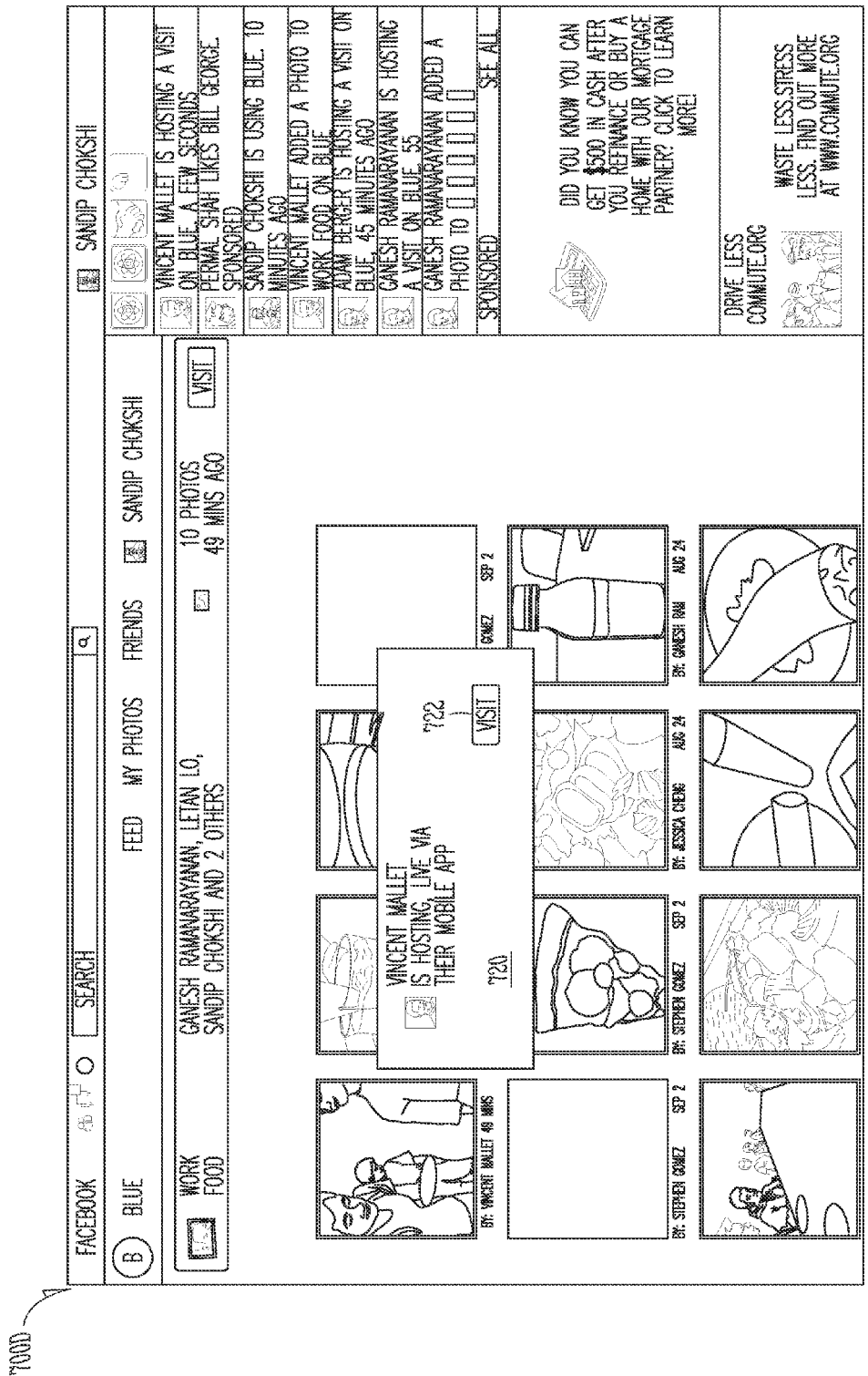
Figure 7G:
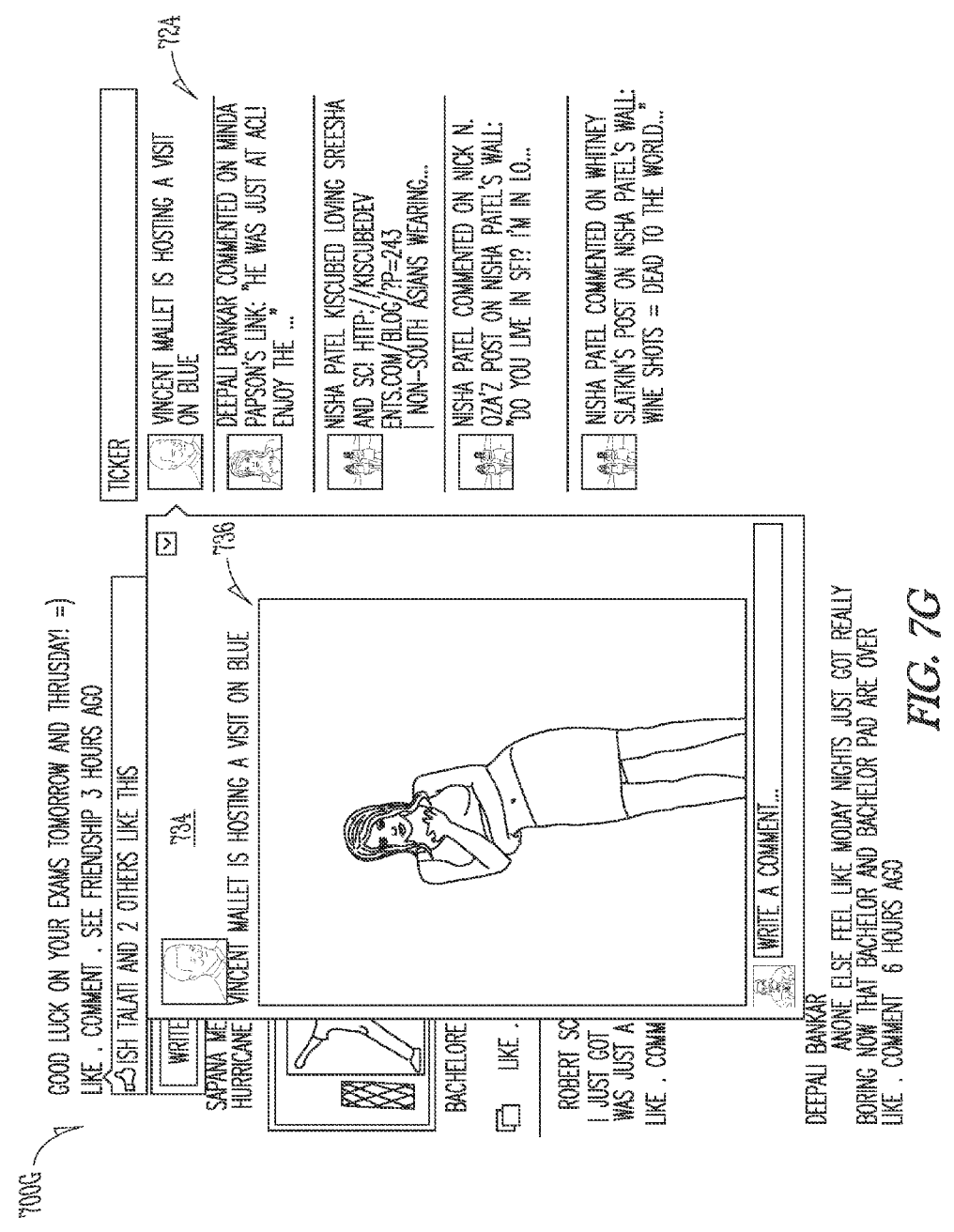

FIG. 7D depicts an example screen view 700D of a "push notification" employing a push notification channel, such as the one mentioned above. In this example, the push notification informs the user that a friend is hosting content, specifically by way of a pop-up notification 720, which may provide a "visit" button 722. In one implementation, in response to the user activating the "visit" button 722, the content 714 sourced by the host may be presented, such as via the screen view 700C of FIG. 7C.

FIG. 7E presents an example screen view 700E of a hosting notification on the user's social networking (Facebook) webpage. In the screen view 700E, the hosting notification is presented as a "gesture" 724 (as described earlier) in a "ticker" of the social networking webpage. In one example, upon activation of the gesture 724, a pop-up area 726 may be presented by which the user may visit the indicated host, as shown in the screen view 700F of FIG. 7F. More specifically, the pop-up area 726 may include a "visit" link 730 to initiate a visit of the host indicated in the pop-up area 726. In an example, activating the link 730 may cause the presentation of a webpage for the application embedded in the canvas of the social networking site, such as shown in the screen view 700C of FIG. 7C. Also shown in the screen view 700F are "like" and "comment" links 732 associated with the social network site, whereby the user may provide input regarding the host or the content to be viewed.

In an alternative to the "visit" link 730, the user may visit the host by way of a "play" button 728 of the pop-up area 726, in which case the content sourced by the host may be provided "inline" within the current social network webpage. An example of such content is presented in an example screen view 700G of FIG. 7G. Therein, a pop-up window 734 associated with the gesture 724 provides the content 736 being supplied by the host. In one implementation, a Flash® player is employed to provide the content 736 in an inline manner.

Figure 7H:
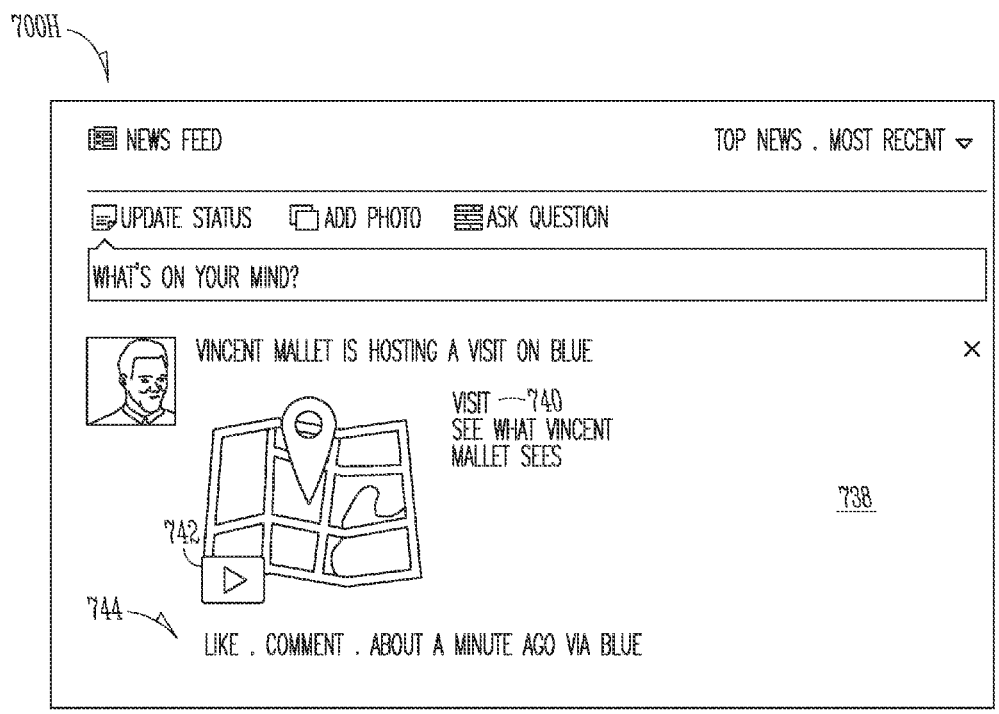
Figure 7I:
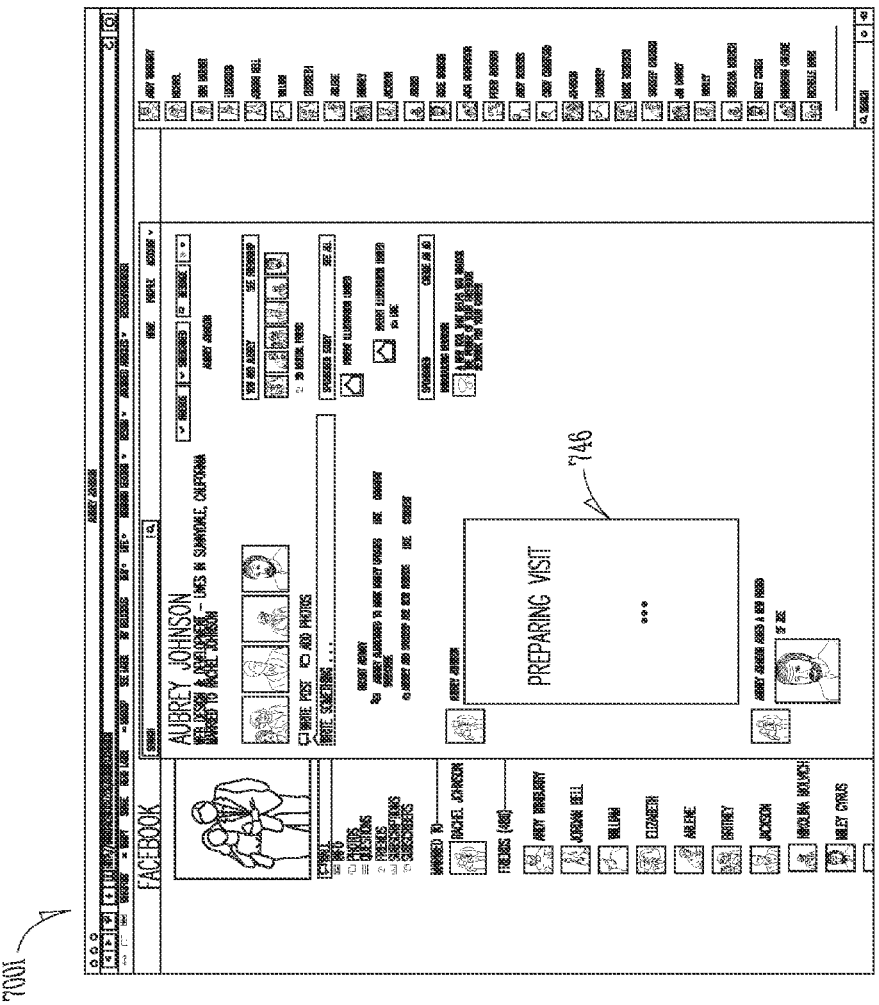
Figure 7J:
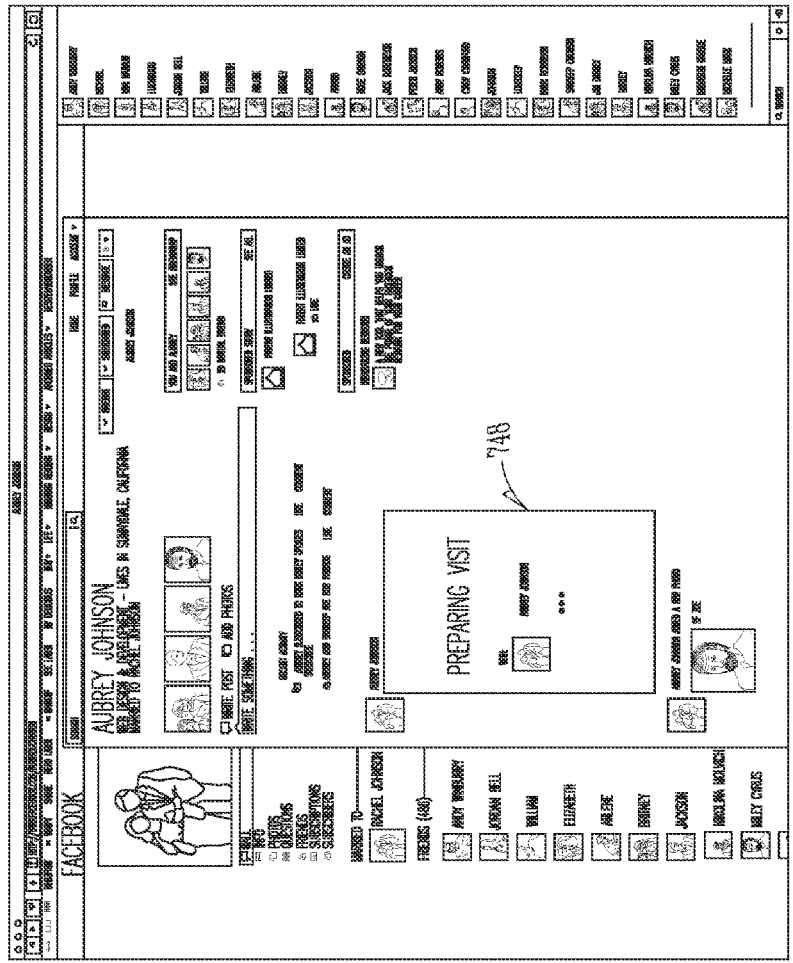

FIG. 7H presents an example screen view 700H illustrating a hosting notification by way of a "news feed" of the social network site. More specifically, a "story" 738 of the news feed may indicate that a particular friend of the user is currently hosting, and provide a "visit" link 740 to visit using the embedded application within the social network site, a "play"

button 742 to visit inline within the news feed, and like/comment links 744, similar to those respective features of the pop-up area 726 of FIG. 7F.

Figure 7K:
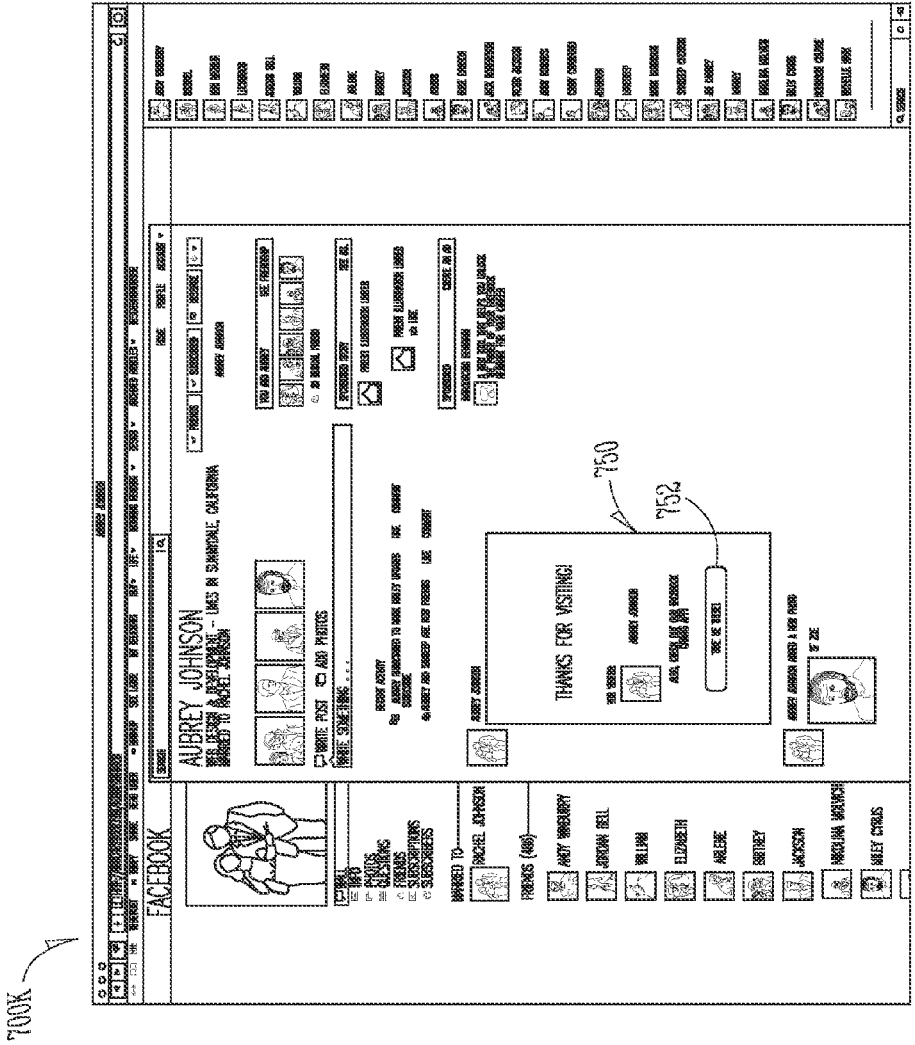
Figure 7L:
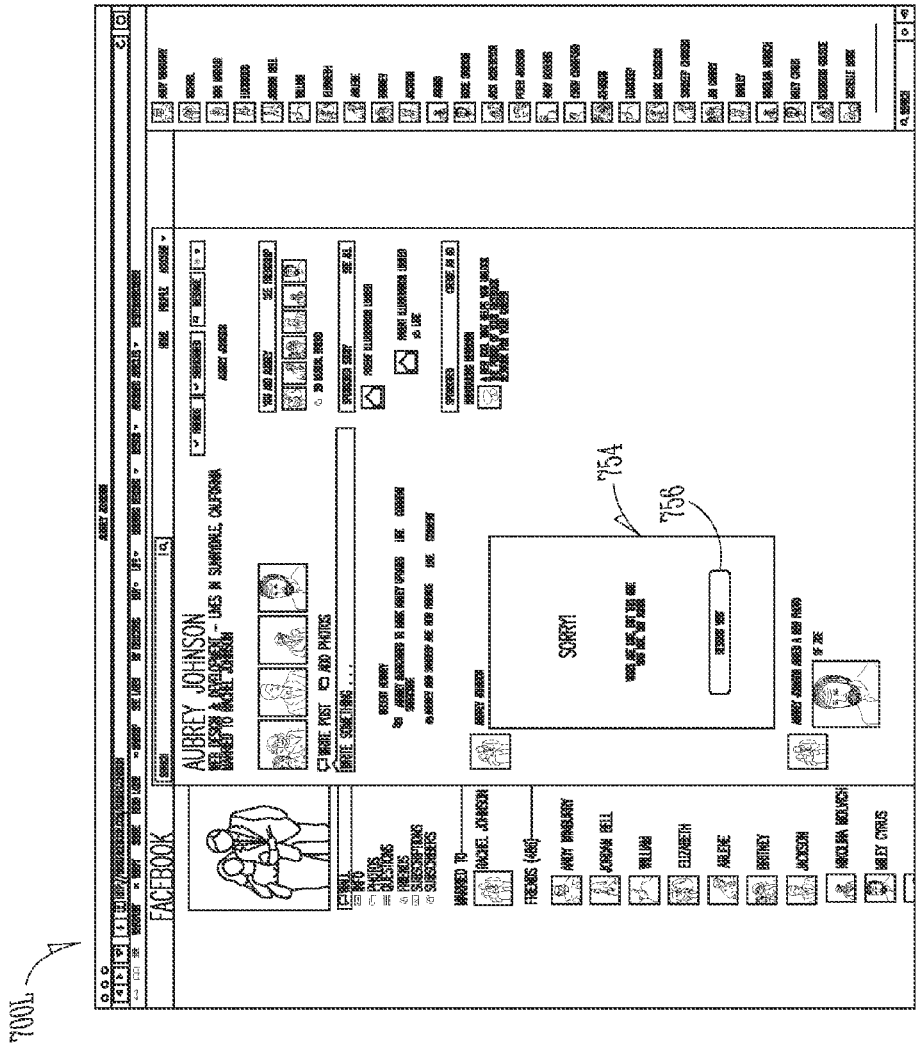
Figure 7M:
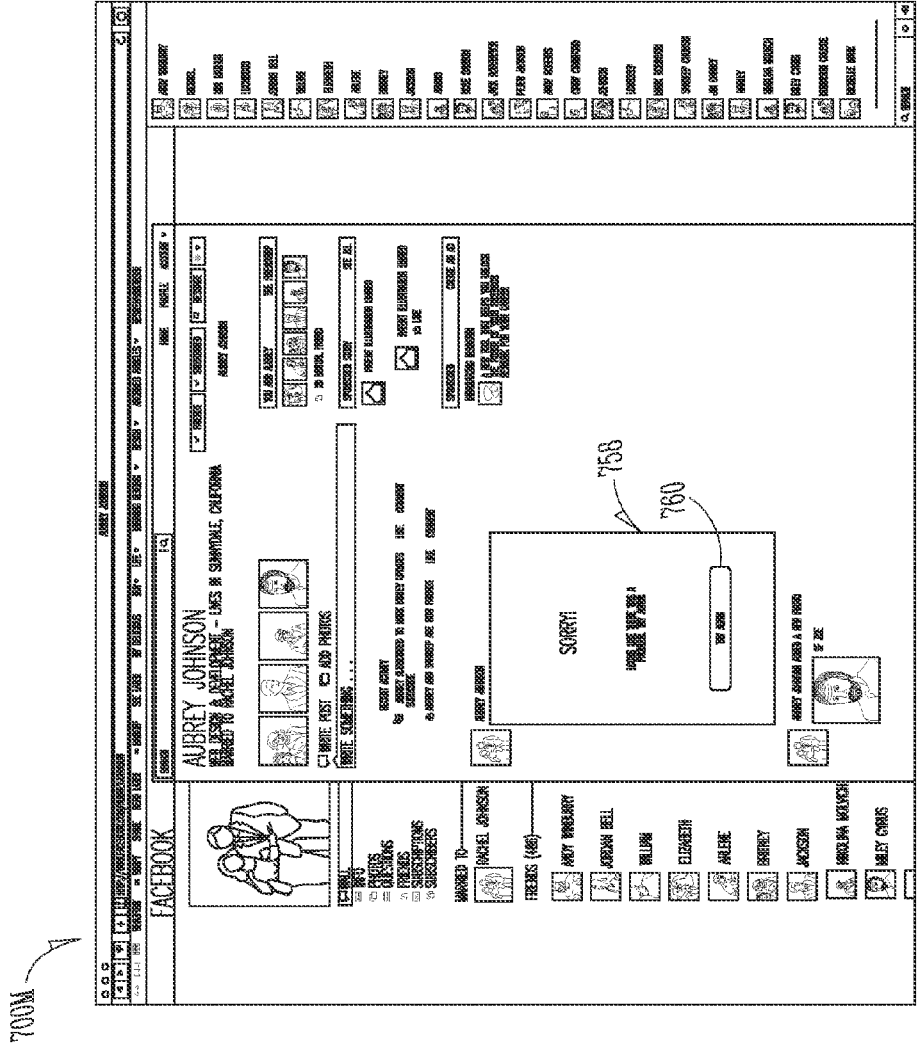

FIGS. 7I through 7M provide example screen views 700I-700M, respectively, of a social network webpage displaying various states of a social network webpage of the user visiting a host as presented by a Flash player. As shown in the screen view 700I of FIG. 7I, once a user has initiated an inline visit via a story, as described above with respect to FIG. 7H, the Flash player provides an informational window 746 on the webpage indicating that the visit is being prepared. In one example, the screen view 700I may be shown immediately after the user initiates the visit. Thereafter, the screen view 700J of FIG. 7J may present a second informational window 748 once the Flash player has contacted a server (such as the server 300 of FIG. 3), providing information about the host, such as, for example, a name and photo or icon. FIG. 7K depicts an example screen view 700K of the same webpage after the visit has successfully completed, providing a third informational window 750 announcing completion of the visit, possible with a button 752 allowing the user to visit the embedded (canvas) application. The webpage may also alert the user in cases in which the visit was not successful, such as the example screen view 700L of FIG. 7L, which indicates that the potential host was unavailable, and possibly provides a button 756 allowing the user to restart the visitation attempt. In FIG. 7M, an example screen view 700M of the webpage informs the user of a network error, and possibly provides a button 760 to allow the user to retry the visit.

Figure 7N:
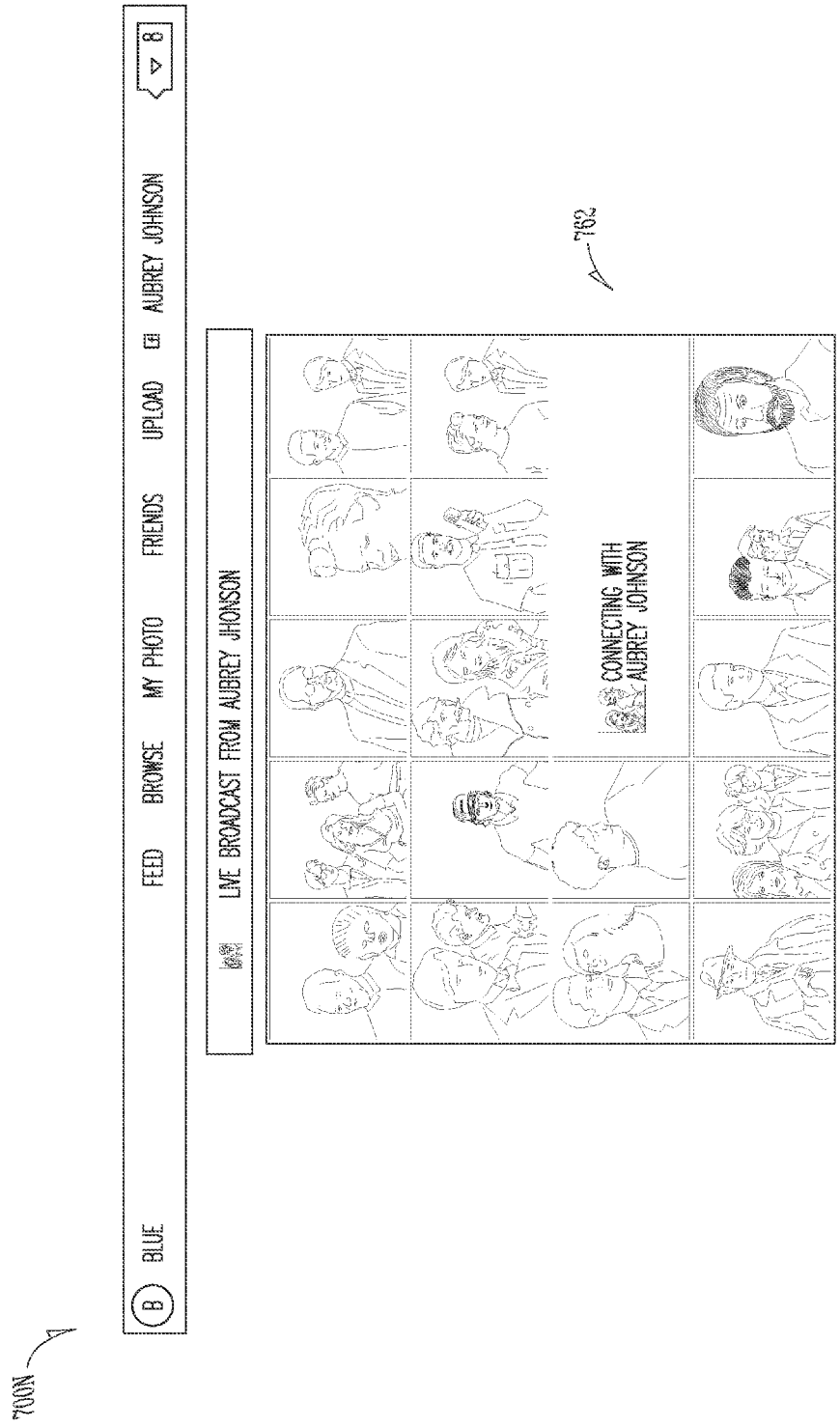
Figure 70:
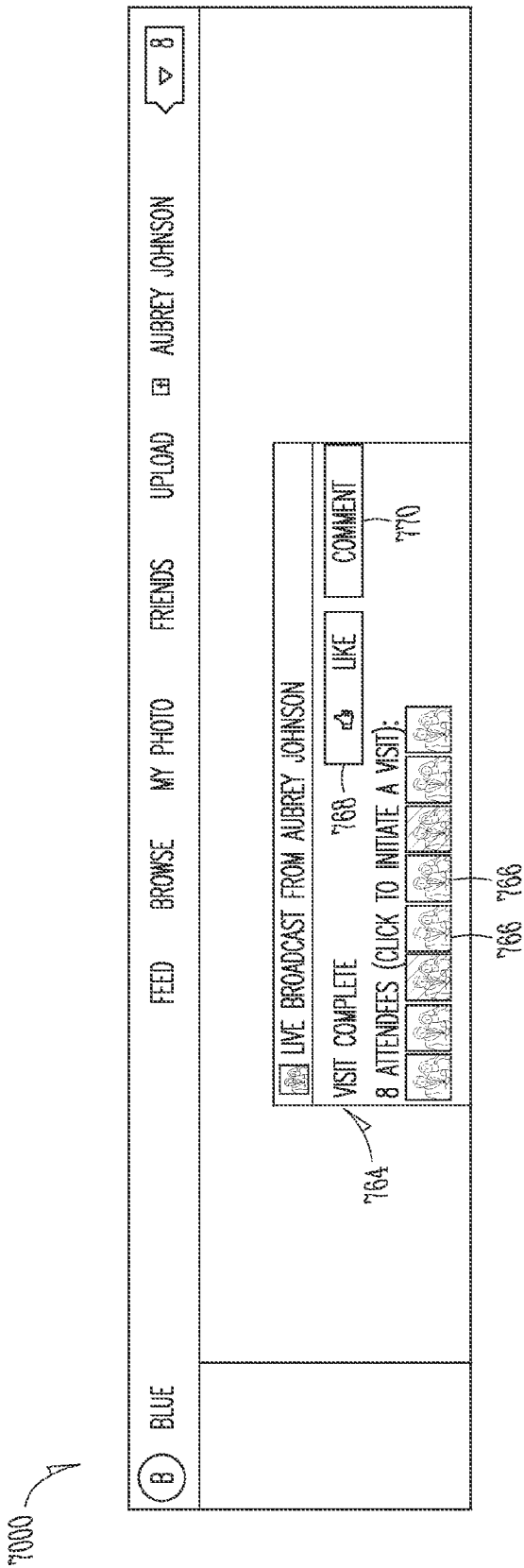

FIGS. 7N and 7O present example screen views 700N and 700O, respectively, reflecting visitation states that the embedded web application, as discussed in detail above, may render. In one example, these states may be provided by the M-JPEG player mentioned above. The screen view 700N, for instance, may be presented to the user in response to the user initiating a visit via the embedded application, such as is described above in conjunction with FIGS. 7A through 7C, with the screen view 700N displaying a message 762 indicating that the connection with the host is being formed. Once the visit is completed, the embedded application may provide the screen view 700O of FIG. 7O, which may provide a completion message 764 and may list attendees of the visit by way of icons or photo 766, any of which the user may activate to initiate a visit therewith.

While FIGS. 6A through 6J and FIGS. 7A through 7O provide several examples of user interfaces associated with the embodiments described herein, many other examples providing the functionality described herein may be employed in other implementations.

As a result of at least some of the embodiments discussed herein, sharing of content, such as still images, video clips, audio segments, and textual data, may be shared easily among a number of user devices while employing a social network, such as Facebook®. For example, identification of possible visitors to a host may be accomplished by way of the social network, such as by way of identifying friends, family members, and others connected in some way to the host via the social network. In some implementations, the host may be informed of potential visitors desiring of a visit to the host, and potential visitors may be informed on a host currently providing content for sharing. Additionally, positive recognition for past or current activities by a user as a host and/or visitor may also be provided via the social network. Other ways of engaging in the sharing of content using the social network, such as by notifying multiple levels of friends in the social network of the content, as described above, may be utilized also. Access to the shared content, as well as various functions related thereto, may be supplied via an application executing on a user device specifically intended for the sharing of content, as well as the social network itself, thus allowing each user to engage in the sharing of content, either as a host or visitor, from a multitude of user devices and execution platforms.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 8:
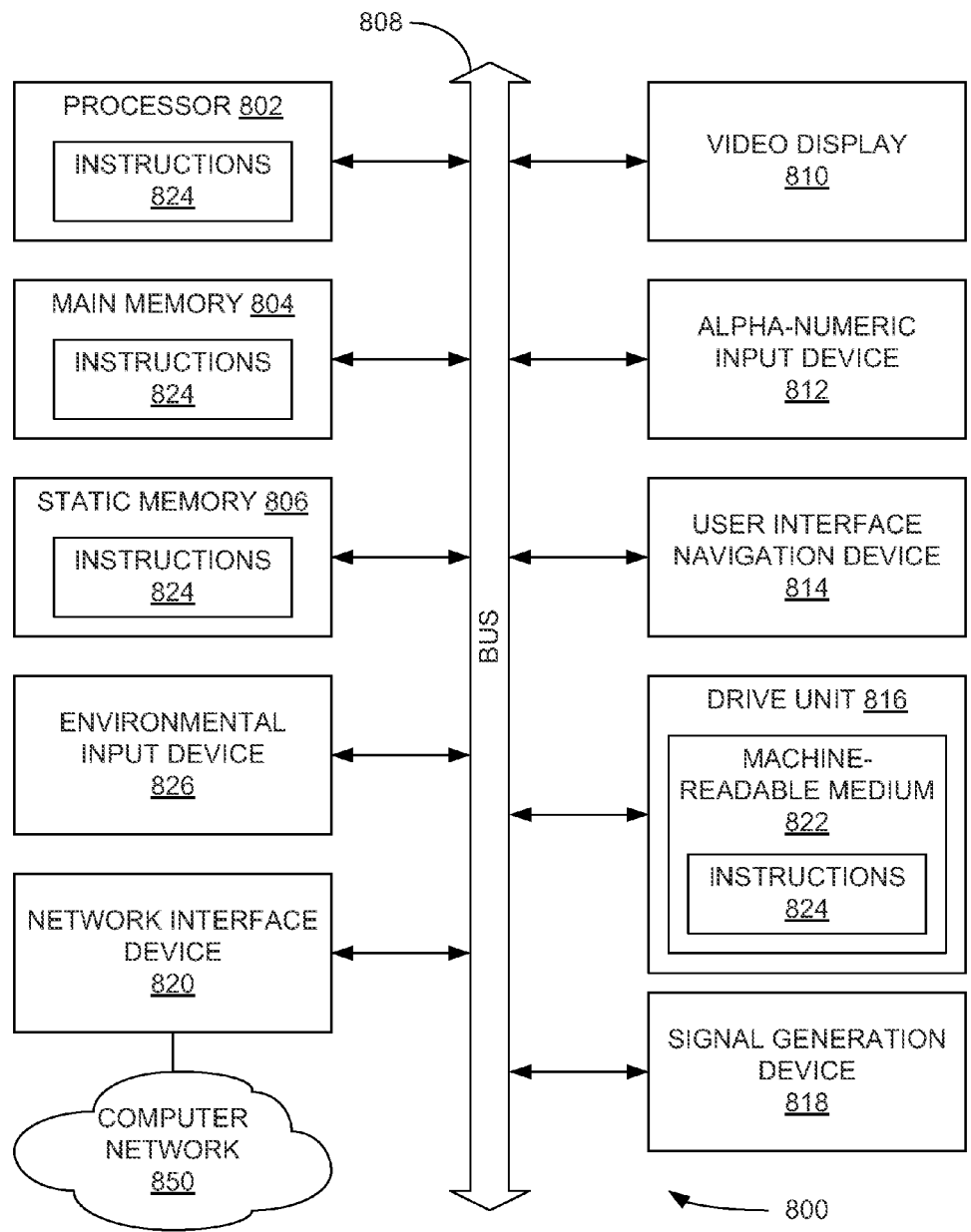
FIG. 8 is a diagrammatic representation of a machine in the example form of a computer system within which a set of instructions for causing the machine to perform any one or more of the methodologies discussed herein may be executed.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820. The computer system 800 may also include a environmental input device 826 that may provide a number of inputs describing the environment in which the computer system 800 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 824 may further be transmitted or received over a computer network 850 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

CONCLUSION

Thus, a method and system to share content among several communication devices have been described. Although the present subject matter has been described with reference to specific example embodiments, it will be evident that various modifications and changes may be made to these embodiments without departing from the broader scope of the subject matter. For example, while the majority of the discussion above notes the use of the embodiments with respect to general-purpose computer systems and applications, other software- or firmware-based systems, such as electronic products and systems employing embedded firmware, may also be developed in a similar manner to that discussed herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

What is claimed is:

1. A method, comprising:
   detecting availability of a first user member mobile device to broadcast real-time streaming live media content generated by the first user member mobile device over a communication network;
   receiving a current location of the first user member mobile device;
   determining that the current location is a location of a newsworthy event;
   identifying, using at least one processor, a second user member mobile device via an association, specified in a social network, of the first user device with the second user member mobile device;
   determining an acceptance by the second user member mobile device to receive the real-time streaming live media content from the first user member mobile device;
   in response to the acceptance, initiating transmission of the real-time streaming live media content provided by the first user member mobile device over the communication network to the second user member mobile device; and
   based on the determination that the current location is a location of a newsworthy event, issuing host invitations to a plurality of user member mobile devices in proximity of the current location requesting indications of willingness to capture additional real-time streaming live media content from the current location.

2. The method of claim 1, further comprising:
   transmitting over the communication network an invitation to the first user member mobile device to broadcast the real-time streaming live media content, the detecting of the availability of the first user member mobile device comprising receiving a response to the invitation indicating the availability of the first user member mobile device to broadcast the real-time streaming live media content.

3. The method of claim 2, further comprising:
   receiving an indication of a location of the first user member mobile device, the transmitting of the invitation to the first user member mobile device being based at least on the receiving of the indication of the location of the first user member mobile device.

4. The method of claim 2, further comprising:
transmitting to the second user device a notification of the availability of the first user member mobile device to broadcast the real-time streaming live media content in response to receiving the response to the invitation, the determining of the acceptance by the second user member mobile device comprising receiving a request from the second user member mobile device to receive the real-time streaming live media content in response to the notification.

5. The method of claim 1, the detecting of the availability of the first user member mobile device to broadcast the real-time streaming live media content comprising receiving an indication of the real-time streaming live media content being captured at the first user member mobile device.

6. The method of claim 1, the detecting of the availability of the first user member mobile device to broadcast the real-time streaming live media content comprising receiving from the first user member mobile device a command to initiate a transfer of the real-time streaming live media content over the communication network from the first user member mobile device.

7. The method of claim 1, further comprising:
transmitting a notification to the second user device, the determining of the acceptance by the second user member mobile device to receive the real-time streaming live media content comprising receiving a request from the second user member mobile device to receive the real-time streaming live media content in response to the notification.

8. The method of claim 7, further comprising:
transmitting over the communication network an invitation to the first user member mobile device to broadcast the real-time streaming live media content in response to receiving the request from the second user member mobile device, the detecting of the availability of the first user device comprising receiving a response to the invitation indicating the availability of the first user member mobile device to broadcast the real-time streaming live media content.

9. The method of claim 1, further comprising:
accessing user preference data corresponding to the second user member mobile device, the determining of the acceptance by the second user member mobile device to receive the real-time streaming live media content being based on the user preference data.

10. The method of claim 9, further comprising:
receiving from the second user member mobile device a communication relating to registration of the second user member mobile device with a service providing the real-time streaming live media content, the communication comprising at least a portion of the user preference data.

11. The method of claim 9, the user preference data comprising a preference by a user of the second user member mobile device for real-time streaming live media content from a first user of the first user member mobile device.

12. The method of claim 9, the user preference data comprising a preference by a user of the second user member mobile device for a type of media content corresponding to the real-time streaming live media content to be received from the first user member mobile device.

13. The method of claim 9, the user preference data being specified by a user of the second user member mobile device.

14. The method of claim 9, further comprising:
accessing historical data describing previous actions initiated via a user of the second user member mobile device; and
generating the user preference data based at least on the historical data.

15. The method of claim 14, the historical data describing at least one of previous media content received at the second user member mobile device, sources of the previous media content received at the second user member mobile device, previous websites visited via the second user member mobile device, and timing data involving actions by the second user member mobile device.

16. The method of claim 14, the historical data describing activities within the social network by a user of the second user member mobile device.

17. The method of claim 1, the initiating of the transmission of the real-time streaming live media content comprising determining a distribution server to distribute the real-time streaming live media content, and transmitting an identification of the distribution server to the first user member mobile device and the second user member mobile device.

18. The method of claim 1, the real-time streaming live media content comprising at least one of a video stream, an audio stream, and a plurality of photo images.

19. A non-transitory computer-readable storage medium comprising instructions that, when executed by at least one processor of a machine, cause the machine to perform operations comprising:
detecting availability of a first user member mobile device to broadcast real-time streaming live media content generated by the first user member mobile device over a communication network;
receiving a current location of the first user member mobile device;
determining that the current location is a location of a newsworthy event;
identifying, using at least one processor, a second user member mobile device via an association, specified in a social network, of the first user member mobile device with the second user member mobile device;
determining an acceptance by the second user member mobile device to receive the real-time streaming live media content from the first user member mobile device;
in response to the acceptance, initiating transmission of the real-time streaming live media content provided by the first user member mobile device over the communication network to the second user member mobile device; and
based on the determination that the current location is a location of a newsworthy event, issuing host invitations to a plurality of user member mobile devices in proximity of the current location requesting indications of willingness to capture additional real-time streaming live media content from the current location.

20. A system comprising:
at least one processor; and
a plurality of modules comprising instructions executable by the at least one processor, the modules comprising:
a social network contacts module to identify a first user member mobile device and a second user member mobile device associated with each other as specified in a social network;
a status module to detect availability of the first user device to broadcast real-time streaming live media content over a communication network, and to determine an acceptance by the second user member mobile device to receive the real-time streaming live media content from the first user member mobile device; and a content module to receive a current location of the first user member mobile device, determine that the current location is a location of a newsworthy event, initiate transmission of the real-time streaming live media content provided by the first user member mobile device over the communication network to the second user member mobile device in response to the acceptance, and based on the determination that the current location is a location of a newsworthy event, issuing host invitations to a plurality of user member mobile devices in proximity of the current location requesting indications of willingness to capture additional real-time streaming live media content from the current location.

21. The system of claim 20, further comprising:
a user preferences module to access user preference data corresponding to the second user member mobile device, the status module to determine the acceptance by the second user member mobile device to receive the real-time streaming live media content based on the user preference data.

22. The system of claim 21, the user preference data comprising at least one of a preference by a user of the second user member mobile device for real-time streaming live media content from a user of the first user member mobile device, and a preference by the user of the second user member mobile device for a type of media content corresponding to the real-time streaming live media content to be received from the first user member mobile device.

23. The system of claim 22, the preference by the user of the second user member mobile device for real-time streaming live media content from the user of the first user member mobile device comprising at least one of a like indication and a positive comment regarding previous media content received from the user of the first user member mobile device.

24. The system of claim 21, the user preference data comprising at least one of data specified by a user of the second user member mobile device, and data generated based on historical data describing previous actions of the user of the second user member mobile device.

25. The system of claim 20, further comprising:
a content storage module to store the real-time streaming live media content received from the first user member mobile device prior to transmission of the real-time streaming live media content to the second user member mobile device.

26. The system of claim 20, the modules further comprising an interface module to receive content transmission control commands from the second user member mobile device, the content storage module to control the transmission of the real-time streaming live media content to the second user member mobile device, the content transmission control commands comprising at least one of a pause command and a rewind command.

* * * * *